United States Patent [19]

Kallis et al.

[11] Patent Number: 5,526,261
[45] Date of Patent: Jun. 11, 1996

[54] PSEUDO-GEAR TRANSMISSION CONTROL SYSTEM AND METHOD

[75] Inventors: Adrian G. Kallis; Charles D. Needham; Kevin L. Brekkestran, all of Fargo; Barry D. Batcheller, West Fargo, all of N. Dak.

[73] Assignee: Phoenix International Corporation, Fargo, N. Dak.

[21] Appl. No.: 419,461

[22] Filed: Apr. 10, 1995

Related U.S. Application Data

[62] Division of Ser. No. 216,250, Mar. 22, 1994, Pat. No. 5,406,483, which is a continuation of Ser. No. 741,604, Aug. 7, 1991, abandoned, which is a continuation-in-part of Ser. No. 700,629, May 15, 1991, Pat. No. 5,305,215.

[51] Int. Cl.[6] .................... G06G 7/70; B60K 41/12; F16H 59/00
[52] U.S. Cl. ............... 364/424.1; 364/424.01; 364/424.03; 364/431.03; 364/431.04; 477/97; 477/37; 477/44; 477/63; 477/110; 477/111; 192/3.3; 192/3.54; 74/335; 74/336 R; 74/359; 74/329
[58] Field of Search ............... 364/424.1, 424.01, 364/424.03, 431.01, 431.02, 431.03, 431.04; 477/110, 111, 37, 901, 97, 43, 78, 81, 154, 155, 143, 63, 123–126; 192/3.3, 3.54, 3.56, 3.58; 74/335, 336 R, 359, 329, 331, 333, 356; 340/439, 870.06, 461; 60/445

[56] References Cited

U.S. PATENT DOCUMENTS 3,628,642  12/1971  Ravenel ............................... 477/81
4,320,381  3/1982  Olivier ................................. 340/439
4,353,272  10/1982  Schneider et al. .................... 477/43
4,913,004  4/1990  Panoushek et al. ............... 364/424.01
5,017,916  5/1991  Londt et al. ...................... 364/424.1

*Primary Examiner*—Kevin J. Teska
*Assistant Examiner*—Jacques H. Louis-Jacques
*Attorney, Agent, or Firm*—Harness, Dickey & Pierce

[57] ABSTRACT

An electronic transmission control system for a self-propelled off-road vehicle having an internal combustion engine and multiple gear powershift transmission controls the powershift transmission and provides the at least on control signal to the engine for selecting the speed at which the engine is to operate. The system preferably includes a first electronic controller that provides transmission control signals required to command the powershift transmission to shift to and operate in any particular one of its forward gears, and a second electronic controller that provides at least one engine control signal required to command the engine to operate at one of a number of different desired engine speeds and to monitor the actual engine speed. By use of gear ranges which overlap slightly, and a throttle that is infinitely adjustable within a range of engine speeds, any given ground speed within the range of possible vehicle speeds can be achieved and maintained, as long as the engine is operating within its overall power envelope. The system also supports a pseudo-gear mode where the operator interface indicates there are more gears in the transmission than actually exist.

20 Claims, 21 Drawing Sheets

| 290 → | | SOLENOIDS | | | | | | |
|---|---|---|---|---|---|---|---|---|
| DIRECTION | GEAR | Y | Z | X | W | V | T | S | Q |
| REVERSE | 1 | X | | | | X | | X | |
| REVERSE | 2 | X | | | | | X | X | |
| FORWARD | 1 | | | X | | X | | X | |
| FORWARD | 2 | | | | X | X | | X | |
| FORWARD | 3 | | | | | X | X | X | |
| FORWARD | 4 | X | | | | | X | X | |
| FORWARD | 5 | | | | X | | X | X | |
| FORWARD | 6 | | | | X | | X | X | |
| FORWARD | 7 | | X | | | X | | | X |
| FORWARD | 8 | | | | X | X | | | X |
| FORWARD | 9 | | | | X | X | | | X |
| FORWARD | 10 | X | | | | | X | | X |
| FORWARD | 11 | | | | X | | X | | X |
| FORWARD | 12 | | | | X | | X | | X |

| | | SOLENOIDS | | | | | | |
|---|---|---|---|---|---|---|---|---|
| DIRECTION | GEAR | Y | Z | X | W | V | T | S | Q |
| REVERSE | 1 | X | | | | X | | X | |
| REVERSE | 2 | X | | | | | X | X | |
| FORWARD | 1 | | X | | | X | | X | |
| FORWARD | 2 | | | X | | X | | X | |
| FORWARD | 3 | | | | X | X | | X | |
| FORWARD | 4 | | X | | | | X | X | |
| FORWARD | 5 | | | X | | | X | X | |
| FORWARD | 6 | | | | X | | X | X | |
| FORWARD | 7 | | X | | | X | | | X |
| FORWARD | 8 | | | X | | X | | | X |
| FORWARD | 9 | | | | X | X | | | X |
| FORWARD | 10 | | X | | | | X | | X |
| FORWARD | 11 | | | X | | | X | | X |
| FORWARD | 12 | | | | X | | X | | X |

☐ = MAXIMUM HORSEPOWER MODE  ⬚ = FUEL ECONOMY MODE  ▨ = COMFORT MODE

□ = 3000 RPM ; + = 2000 RPM ; * = 1000 RPM

SHIFT MAP

× = UPSHIFT POINT ; + = DOWNSHIFT POINT

1

PSEUDO-GEAR TRANSMISSION CONTROL SYSTEM AND METHOD

CROSS-REFERENCE TO RELATED APPLICATIONS

This application is a divisional application of application Ser. No. 08/216,250 filed Mar. 22, 1994 and entitled "Engine Variable Transmission Control System", now U.S. Pat. No. 5,406,483 granted Apr. 11, 1995, which is a continuation of application Ser. No. 07/741,604 filed Aug. 7, 1991 (now abandoned), which was a continuation-in-part of application Ser. No. 07/700,629 filed May 15, 1991, now U.S. Pat. No. 5,305,215 granted Apr. 19, 1994 and entitled "Expandable Mobile Modular Microcomputer System for an Off-Road Vehicle".

FIELD OF THE INVENTION

This invention relates generally to electronic transmission control systems for self-propelled off-road vehicles which have an internal combustion engine and multiple gear powershift transmission, and specifically to such control systems which have advanced electronic controllers and advanced methods for efficiently operating such engine/transmission combinations.

BACKGROUND OF THE INVENTION

Powershift transmissions have a plurality of gears, shafts and clutch packs which are engageable in a number of different patterns to achieve distinct input/output drive ratios known as transmission gear ratios or simply "gears". In such transmissions, any given gear is selected by providing a proper pattern of electrical signals to selected solenoid actuators on a bank of hydraulic valves. These electrically-controlled transmissions overcome the problems associated with mechanically linking operator-actuated controls to a large size multiple-gear transmission, which is the type of transmission required in many kinds of heavy-duty off-road vehicles.

Microprocessor-based electronic controllers for powershift transmissions have been used for a number of years by various companies. One example of such a design is found in U.S. Pat. No. 4,425,620 entitled "Electronic Control for Power Shift Transmission", which is hereby incorporated by reference. That patent discloses a microprocessor-based electronic control system which has a mode select lever and an upshift-downshift pulser lever by which the operator may indicate the desired vehicle direction and gear in which a powershift transmission is to be operated.

When an operator momentarily disengages the clutch of a powershift transmission under a load and thereafter re-engages the clutch, a conventional powershift transmission produces a jolt when the speed of the output shaft of the transmission is not matched with the ground speed. The electronic controller described in the foregoing patent substantially eliminates the jolt by automatically selecting a gear of the transmission which causes the transmission output to match closely the ground speed of the off-road vehicle. The patent discloses a particular use of a ground-speed matching algorithm designed to help eliminate such jolts. However, the disclosed control system does not provide an electronically controlled gradual engagement of the clutch of the powershift transmission during gear shifts, it simply operates the solenoids in an on/off manner. In conventional powershift transmissions, the rate of clutch engagement is dependent upon hydraulic and mechanical controls such as orifices and one or more accumulators. By themselves such mechanical controls are not very effective under all conditions for providing smooth or jolt-free gear shifts.

The use of proportional actuator devices, such as hydraulic valves operated by torque motors is known in the agricultural and construction equipment art to provide relatively soft engagements thus helping avoid jolts during gear shifts. Such proportional actuation devices are frequently operated by pulse width modulated (PWM) signals whose duty cycle is varied in proportion to the desired average or DC value desired to be produced by the actuator. An electronic control system using such PWM signals to operate a powershift transmission for jolt-free soft engagements is described in U.S. Pat. No. 4,855,913 entitled "Electronic Control System for Powershift Transmission", the disclosure of which is hereby incorporated by reference.

While aforementioned electronic controllers for powershift transmissions have proved useful, they are only controlling one-half of the over-all engine/transmission combination, namely the transmission and not the engine. When the engine and transmission are considered in combination, a different set of problems is presented, as shown by the discussion below.

In older diesel power plants used for heavy-duty off-road vehicles, the horsepower-to-engine speed curve peaked at a relatively narrow band of engine speeds. This is illustrated by torque curve 36 and horsepower curve 38 in FIG. 1, which show a power band 40 of curve 36 above horizontal line 42 where the engine is almost exclusively operated. This relatively narrow power band 40 occurs over an engine speed range from about 1860 RPM to about 2000 RPM, at which the vehicle operates most efficiently that is the range at which the greatest amount of usable pulling power can be extracted from the engine. This kind of torque-to-engine-speed characteristic represented by curve 36 effectively forced the driver who needed to operate such a vehicle near its maximum power rating to find just the right gear in which to run the transmission, in order to be able to provide sufficient torque from the engine to carry out the tasks at hand.

Because such older engines only ran efficiently in a rather narrow band of speeds, the problem of how to extract near-maximum power from a vehicle was solved by the development of powershift transmissions having more and more gears, such as 12, 16, 24 and even 36 gears. Providing such additional gears presented a second problem of adding significantly to the cost of the transmission. But the benefits of being able to extract the maximum power from the engine over a wide range of speeds, and being able to run at a particular desired speed and obtain almost full power from the engine, were perceived sufficiently worthwhile to justify such increased transmission costs.

Transmissions having a large number of gears proved very popular. In some applications, particularly in certain agricultural tractor operations, a driver often wants to run the vehicle at a relatively constant speed without having to adjust the throttle or gear for variations in the load being experienced by the power plant. Such applications may involve planting, applying fertilizers, or harvesting crops, or others where the uniformity of the results achieved is fairly dependent upon maintaining a relatively constant vehicle ground speed. In other applications, especially farming, the operator's attention is taken up by the tasks of steering, or watching the implements hooked up to the off-road vehicle. Further, in some applications the operator wants the vehicle to run at a constant speed in a single gear in order to minimize wear-and-tear on the power plant. In still other applications, any shifting of gears effectively can only be accomplished by stopping the operation in progress. For example, when deep plowing a field, a tractor cannot easily switch gears since the tractor would immediately stop moving due to the braking action created by the plow in the ground. For these and other reasons, many farmers have grown used to setting their tractors to run in a single gear and at a single speed setting for a given application. The foregoing practices presented the problem of excessive fuel consumption.

Recently, manufacturers of large diesel engines, such as Cummins Engine Company of Columbus, Indiana, have been able to create engines having a broad and relatively flat torque-to-engine-speed curve. These advances are made possible in part by advances in electronic controls for engines. Cummins has a subsidiary, Cummins Electronics in Columbus, Ind., which designs and manufactures electronic engine control systems for large diesel engines. In FIG. 1, torque curve 44 and horsepower curve 46 illustrate the kind of broad performance range obtainable with such newer engines. Note that torque curve 44 has a large, relatively flat or constant torque portion 48, which is above horizontal line 42 from about 1700 RPM to about 2100 RPM.

The advent of such engines for off-road vehicles presents new opportunities to overcome the problems mentioned above, by optimizing drive train performance and increasing the number of modes in which an off-road vehicle equipped with a powershift transmission may be operated.

It is the principal object of the present invention to provide increased flexibility in the operation of large, off-road vehicles by coordinating the operation of the powershift transmission and an electronically-controlled engine via an electronic transmission control system. An important related object of the present invention is to provide for multiple modes of off-road vehicle operation, including a maximum horsepower mode and a fuel economy mode, by using the transmission control system as a master controller.

Another object of the present invention is to employ the broad torque versus engine speed characteristics of advanced diesel engines to obtain nearly infinite speed selection and gear adjustment in large off-road vehicles, especially tractors and other agricultural equipment, with fewer gears than required in conventional engine/powershift transmission combinations.

Yet another object is to provide a pseudo-gear mode in an engine/transmission combination which makes it appear to the operator that the off-road vehicle has more gears than actually exist.

SUMMARY OF THE INVENTION

In light of the foregoing objects and to help solve above-identified problems, there is provided, according to one aspect of the present invention, an electronic control system for a self-propelled off-road vehicle having an internal combustion engine and powershift transmission with multiple forward gears. The control system controls the powershift transmission and provides at least one control signal to the engine for specifying the speed at which the engine is to operate. The control system comprises: first electronic controller means for providing transmission control signals that specify in which specific one of its forward gears the powershift transmission is to operate; and second electronic controller means for providing at least one engine control signal required to command the engine to operate at one of a number of different engine speeds within a predetermined range.

The first controller means includes first electrical output means for commanding the transmission to operate in a particular gear as specified by the current transmission control signals. The second controller means includes second electrical output means for commanding the engine to operate at a particular engine speed indicated by the engine control signal. Both controller means each include communications means for sending and receiving digital signals to and from the other electronic controller means.

The control system also preferably includes the display means, responsive to and in communication with at least one of the controller means. The display means is for indicating to the operator the gear in which the transmission is currently operating and the speed at which the engine is operating. It may also show further information, including information received from the other controller means.

The electronic control system preferably also includes automatic means for controlling a shift of the transmission to a higher gear or to a lower gear. Automatic means may also be provided for generating a sequence of successive upshift or downshift commands. Further still, the system may include automatic means for determining, based at least in part upon vehicle ground speed, which gear to shift to next, that is, an automatic ground speed matching means.

According to a second aspect of the invention, there is provided a second electronic control system for the same basic application set forth above. This control system comprises means for receiving an operator selection of a desired vehicle speed, and electronic controller means for providing transmission control signals required to command the powershift transmission to operate in any given one of its forward gears, and for providing at least one engine control signal required to command the engine to operate at any given speed within a range of possible engine speeds. In this system, the controller means includes first and second electrical output means for respectively causing the engine to operate at a given engine speed as indicated by the engine control signal.

The controller means also includes first automatic means, responsive to the means for receiving the operator selection, for selecting the transmission gear and then a desired engine speed required to achieve the desired vehicle speed. As before, the controller means also preferably includes second automatic means, for generating a series of gear shift commands. The shift commands each preferably occur at a predetermined minimum interval of time after completion of a previous shift command, if any, in the series.

In the second control system, there may further be operator input means for receiving from an operator a selection of one of a plurality of modes in which the engine may be operated. The possible modes of operation to be selected include a fuel economy mode and a maximum power mode.

In the maximum power mode, the electronic controller means selects a transmission gear and an engine speed which produces substantially maximum output horsepower from the engine/transmission combination. In the fuel economy mode, the controller means selects a transmission gear and an engine speed for achieving substantially optimal fuel economy from the engine/transmission combination.

According to a third aspect of the present invention, there is provided a particular operator interface for self-powered off-road vehicles. The method indicates to the operator, by display or other technique, that the transmission has more forward gears than actually exist. This method has been created to take advantage of the new generation of diesel power plants with their own electronic controllers that operate at relatively high torques over a fairly wide range of engine speeds. For each actual gear, the engine is preferably operated at two distinct speeds, thereby creating the illusion for the operator that the vehicle has a narrow torque-engine speed curve and two separate gears for each transmission gear which actually exists. Thus, a powershift transmission with 12 forward gears, for example, can be made to appear as though it has 24 forward gears. If three distinct speed points are used for each actual gear, such a 12-gear transmission will appear to have 36 gears. In this manner, vehicle operators who are used to selecting a given gear of the transmission in order to achieve a particular vehicle speed will be able to operate an off-road vehicle having far fewer actual gears in a highly familiar way.

These and other aspects, objects, features and advantages of the present invention will be more fully understood from the following detailed description and appended claims, taken in conjunction with the drawings.

BRIEF DESCRIPTION OF THE DRAWINGS

In the Figures, where like reference numerals are used to designate similar components, functions or blocks:

FIG. 11 illustrates various functions of a main software loop;

FIGS. 12 and 13 illustrate a 4 millisecond shift control software loop used to control the progress of shifts between gears of a powershift transmission;

FIG. 14 illustrates a 16 millisecond timer software routine used to control updating various aspects of the first controller;

FIGS. 15 and 16 illustrate a mode control software routine;

FIG. 17 illustrates a sequential shifting routine;

FIGS. 18 and 19 illustrate downshift and upshift routines respectively;

FIG. 20 illustrates the functions of the main software loop; and FIG. 21 illustrates a 16 millisecond timer routine;

FIG. 22 illustrates the 4 millisecond shift control software loop used to control the progress of shifts between gears of the transmission;

FIG. 23 illustrates the mode control routine;

FIGS. 25 and 26 illustrate downshift and upshift routines respectively.

DETAILED DESCRIPTION OF THE PREFERRED EMBODIMENT

It should be understood that the following description of the preferred embodiment is merely exemplary in nature and is not intended to limit any invention claimed herein, or its application or uses. In particular, those skilled in the art should appreciate the disclosed implementation, including both the hardware and software, is subject to modification and variation, as may be reasonably expected given the level of skill and general knowledge in the field.

Figure 2:
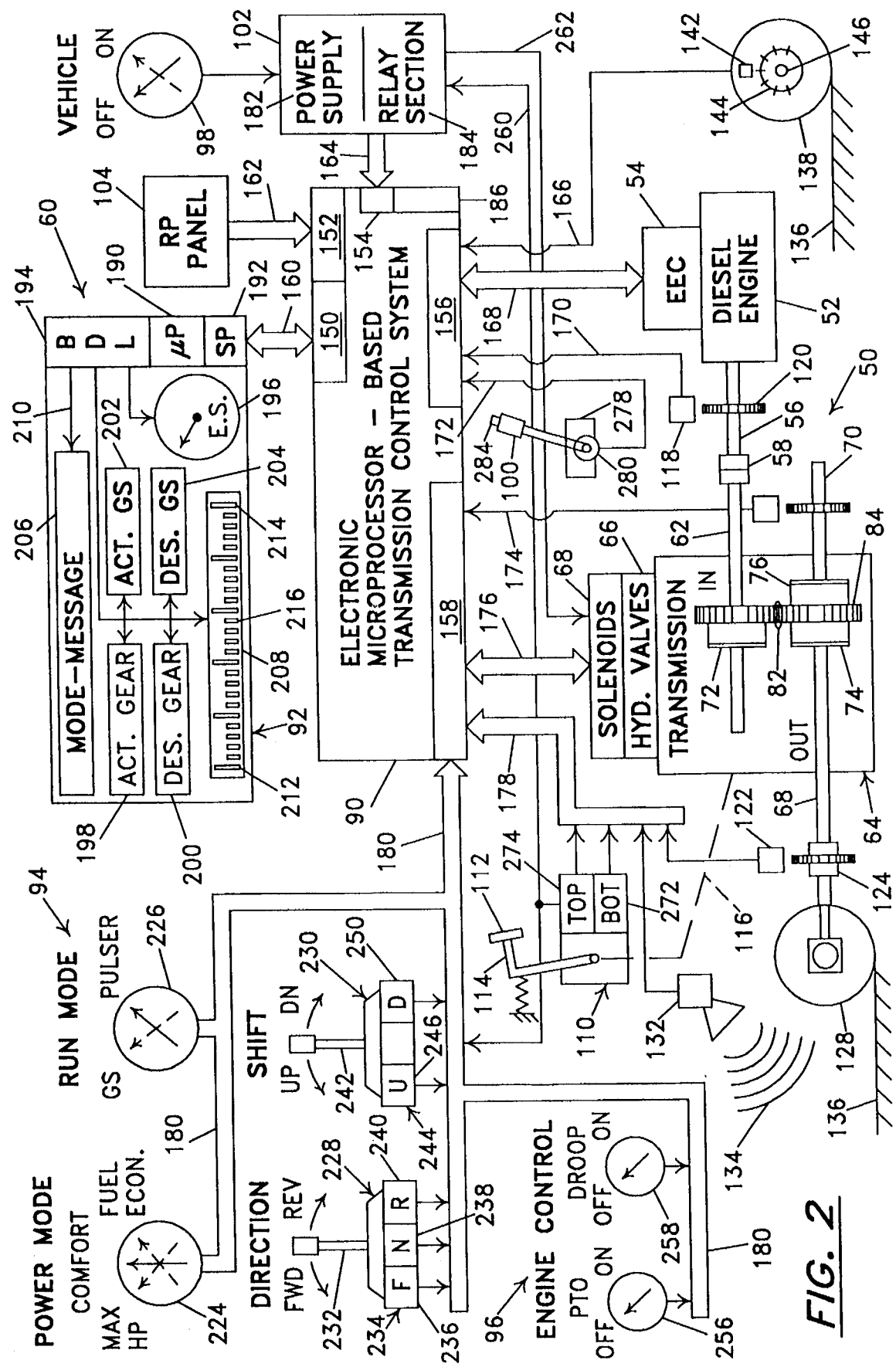
FIG. 2 is a block diagram showing one possible overall arrangement for an electronic control system of the present invention, having various operator interface devices and vehicle sensors connected to a powershift transmission and an electronic engine controller of an internal combustion engine.

FIG. 2 shows the drive system 50 of an off-road vehicle which utilizes the transmission control system 60 of the present invention. The vehicle drive system 50 includes an internal combustion engine 52 with an electronic engine controller 54 which supplies power to engine output drive shaft 56 through a drive train including coupling means 58 and input drive shaft 62 of a powershift transmission 64. In the preferred embodiment of the present invention, the transmission 64 is of the type which has a plurality of gear ratios which are selected by actuation of hydraulic valves 66, which in turn are selected by energizing solenoids 68. As is customary, each hydraulic valve shifts upon energization of its solenoid, and returns upon deenergization of its solenoid, typically due to an internal spring within the valve.

The transmission 64 also includes a drive output shaft 68 and a power takeoff (PTO) shaft 70. The transmission normally will have additional intermediate shafts (not shown), depending upon how many gears the transmission has.

One or more clutch packs are associated with each shaft such as shafts 62, 68 and 70, as illustrated by clutch packs 72, 74 and 76, and their state determines whether their associated gears, such as gears 82 and 84, are coupled to their respective shaft or are free-wheeling.

In a prototype vehicle using the system of the present invention, a Fuji Tekko powershift transmission Model No. EW16 from Fuji Tekko Company of Kosai-City, Shizuoka, Japan, which has twelve forward gears, two reverse gears and eight clutches, is employed as the transmission 64, and a Cummins diesel engine Model No. NTA855 is employed as engine 52 with a Cummins Electronics off-highway engine controller employed as engine controller 54.

The control system 60 also includes an electronic control system 90, a dashboard display console 92, a set 94 of transmission control switches and levers, engine function and accessory control switches 96, a vehicle ignition switch 98, an engine throttle unit 100 and a controlled electrical power unit 102. A reprogramming panel 104 may optionally be used to reprogram the control system 90.

The transmission 64 has a conventional clutch pedal assembly 110 having a pedal 112 mounted on a spring-loaded pivoted lever 114, which can be used to manually disengage the master clutch (not shown) of the transmission, as suggested by dashed line 116 indicating a mechanical linkage.

The control system 60 also includes one or more speed sensor systems, which can be of any known type. The engine speed sensor system may be a variable reluctance sensor 118 that detects passing teeth of flywheel gear 120 connected to engine output shaft 56. The transmission output speed is detected by another sensor system including variable magnetic reluctance sensor 122 which detects passing teeth of rotating gear 124 coupled to the output transmission drive shaft 68. Sensor 122 gives an indication of the apparent ground speed since the output shaft 68 is coupled to driven wheel 128 of the vehicle. As is well known, driven wheels are subject to slippage, particularly in heavy agricultural applications, such as deep plowing.

In order to provide an indication of true ground speed, a conventional radar horn unit 132, which bounces microwave signals 134 off the earth's surface 136, may be used to obtain a very accurate reading of true ground speed. Alternatively, if the vehicle has a free-wheeling tire, such as tire 138 shown in the lower right-hand corner of FIG. 2, another variable reluctance sensor 142 may be used to obtain a true ground speed signal by monitoring the passing teeth of gear 144 journalled on the axle 146 supporting the wheel and rim assembly for tire 138.

The electronic control system 90 includes a suitable number of input and output ports, digital and analog, such as ports 150 through 158, which receive or send electrical signals as indicated by broad and narrow lines 160 through 180, each of which represent one or more electrical paths, which may be cables, wires or wiring harnesses. (Note that fiber-optic signal paths may be used if desired in place of one or more of the electrical paths).

The controlled power unit 102 includes a power supply section 182 and a power-switching relay section 184. The control system 90 includes a watchdog timer circuit 186 which is electrically connected to and enables the relays of the power-switching section. If for any reason, the watchdog timers are not periodically reset as they are supposed to be by the microprocessor(s) within control system 90, the power-switching section is instructed to enter a limp-home mode. The details of the internal hardware of electronic control system 90 and unit 102 are shown in greater detail in FIG. 4. The details of the construction of controlled power unit 102, including the sections 182–186 thereof and its interface to electronic control system 90 are described in detail in the above-referenced U.S. patent application Ser. No. 07/700,629, and thus it will not be repeated here.

The dashboard display unit 92 may be as simple or as complex as desired. A more complex form is shown in FIG. 2, and has its own microprocessor 190 that communicates by a serial port interface 192 over path 160 with electronic control system 90. Display unit 92 also includes a buffer/driver/latch (BDL) section 194 that provides signals to operate various individual displays 196 through 208 via electrical wiring paths represented by lines extending from BDL section 194, such as line 210. The displays 196 through 208 may take any conventional or suitable form. (For example, although presently shown as individual displays, a two-dimensional flat panel display or cathode ray tube may be utilized instead to show the same information if desired.) Display 196 has a rotary format to indicate actual engine speed, and it may be a digital or analog display device. Displays 198 through 204 are preferably 7-segment light emitting diode (LED) displays or liquid crystal displays (LCDs) having as many digits and decimal points as necessary to display desired values. Displays 198 and 200 preferably are 2-digit displays of the actual gear and desired gear respectively. Displays 202 and 204 are preferably 3-digit displays with a single decimal point between the second and third digit for displaying actual ground speed and desired ground speed respectively. Display 206 is preferably a 20-to-40 character dot matrix display for presenting one or more alphanumeric messages, such as the current mode(s) of operation that the control system 90 is in, and instructional, warning or error codes or messages. Longer full-text messages can be presented by conventional scrolling techniques or by successively presenting portions of the message.

Display 208 is an optional backlit LCD bar graph display which may have about 26 separate bar segments, with each fifth segment being larger than adjacent bar segments. Such a bar graph display is available from the assignee of the present invention, Phoenix International Corporation of Fargo, N.D., as part of an overall dashboard display for off-road vehicles. In the present invention, the bar graph display 208 is utilized for new purposes, namely giving a relative indication of where the current desired engine speed or current actual ground speed is with respect to the upshift and downshift points associated with the present gear. This is accomplished, for example, by having the end bar segments 212 and 214 be illuminated and represent the downshift and upshift points, while having the current engine speed indicated by another illuminated segment such as segment 216 between the end segments. The location of the intermediate illuminated segment is free to move left or right on display 208 as engine speed (or ground speed) changes by turning the segment 216 off and turning on adjacent segments. In this way, the relative position of the illuminated intermediate segment provides an indication of how the desired engine speed (or actual ground speed) is changing relative to the shift points. Alternatively, all bar segments to the left of segment 216 may be illuminated. In either manner, the operator is graphically presented with information about where the vehicle is operating in its present gear relative to the upper and lower shift points. Armed with foregoing description, the design and implementation of dash display assembly 92, including the internal controller represented by blocks 190–194 and the internal displays 196–208, is within the skill of those in the art and need not be further described here.

The reprogramming (RP) panel 104 may take any suitable or conventional form. For example, on a factory floor, the RP panel 104 may be a portable personal computer. In the field away from the factory, RP panel 104 may take the form of a portable hand-held calculator-like device with a suitable multiple-button operator interface pad and a limited character display unit, such as a 2-row LCD display.

As illustrated in FIG. 2, the sets 94 and 96 of operator switches and levers may take any conventional or suitable form to permit the driver of an off-road vehicle to communicate desired operating commands and modes to the control system 90. Thus, the individual switches and lever assemblies which are illustrated and described below are only a few of the many possible sets of operator input devices that may be used for such operator interface purposes. For example, a multiple-button keypad or coded thumb-wheel switches may be used to enter commands or digital representations of desired values or modes, or individual switches and potentiometers may be used for such purposes.

The set 94 of switches and levers are used for selecting or specifying transmission commands. Set 94 includes selector switches 224 and 226 and pivotable lever assemblies 228 and 230. Switch 224 is used to select the Power Mode of transmission operation and includes three positions, namely OFF (center position), MAX HP (for "maximum horsepower"—left position) and FUEL ECON (for "fuel economy"—right position). The switch 226 is used to select the Run mode for the transmission and includes two positions, namely GS (for "ground speed"—left position) and PULSER (right position). The lever assembly 228 is used to select the direction via pivotable hand lever 232 having three positions, namely Neutral (center position), Forward (left position) and Reverse (right position). The base 234 of lever assembly 228 may include three switches 236, 238 and 240 which respectively indicate when the lever 232 is in the forward, neutral or reverse position. The assembly 228 preferably has detents so that the lever will remain in the last position it is placed. The lever assembly 230 includes a pivotable hand lever 242 having three positions, namely a no-action position (center), Up (left position) and Down (right position). The base 244 may include limit switches 246 and 250 which respectively indicate when the lever 242 is in the up and down positions. (Note, the presence of lever 242 in its center position is easily determined by observing that neither switch 246 nor switch 250 is actuated.) The assembly 230 is preferably spring-loaded to return the lever 242 to its center position when released. Switches 236–240 and 246–250 may be of any suitable type including microswitches, non-contact magneticallyoperated reed switches or combinations of the above. Lever assemblies 228 and 230 are preferably arranged so that levers 232 and 242 move back and forth in the direction of the longitudinal axis of the vehicle. Other lever or joystick arrangements may be used instead of the one just described, as long as the basic operator interface functions are performed. The precise arrangement used does not make a difference to the present invention.

The set 96 of switches is used for selecting or specifying either engine functions or commands or accessory functions or commands, and includes two "On-Off" selector switches 256 and 258. Switch 256 is used to turn the PTO shaft off and on via a solenoid-actuated hydraulic valve (not shown). Switch 258 is used to specify whether the "droop" function of engine controller 54 is on or off. When the droop function is on, engine controller 54 allows the engine 52 to lug down (that is, decrease its RPM) in response to an increasing load, as a conventional engine does. When the droop switch 258 is in its off position, the engine controller 54 attempts to maintain the speed of engine 52 at precisely the desired engine speed, even as the load on the engine varies considerably.

The selector and lever switches 224–258 just described are connected to one or more wiring harnesses represented by electrical path 180 in FIG. 2. Some of these switches, if desired, may also be wired into the controlled power unit 102. For example, when the vehicle is first turned on through vehicle "On-Off" switch 98, it may be useful to ensure that the direction lever 232 is in its neutral position prior to engaging any of the clutches of the powershift transmission. The electrical interconnection between controlled power unit 102 and the switch sets 94 and 96 is represented by line 260. Line 262, extending from controlled power unit 102 represents direct electrical connections between unit 102 and the solenoid bank 68 of the powershift transmission 64. The functions and electrical connections required for "limp-home" operation are described in the two above-referenced U.S. patents and in the co-pending patent application and, thus, need not be further described here.

The clutch pedal assembly 110, shown in FIG. 2, also includes switches 272 and 274, which are respectively used to detect the presence of the pedal 112 in its fully depressed position and its fully raised position. These limit switches may take any conventional suitable form, including microswitches, reed switches or a combination of the two forms.

The engine throttle lever 100 is mounted on a suitable base 278, which includes a position-indicating device 280 which may take any suitable form including a potentiometer, resolver or encoder. The device 280 presents an analog or digital signal via path 172 to control system 90, whose magnitude or value represents the position or setting of lever 100. This signal is, in turn, relayed through electrical path 168 to the electronic engine controller 54. Also, the value of the electrical signal on path 172 is read by control system 90 as the throttle position command from the operator. The throttle lever 100 preferably includes some releasable detent mechanism, which may take any suitable form including a small spring-loaded band brake (not shown) operated by release button 284, which maintains the lever in position once set by the operator. Those in the art will appreciate that position-indicating device with knob such as a potentiometer may be used directly in place of the lever. A key pad with suitable electronic latch circuit to hold an entered value may also be used in place of throttle lever 100 and its base 278.

Figures 1, 3:
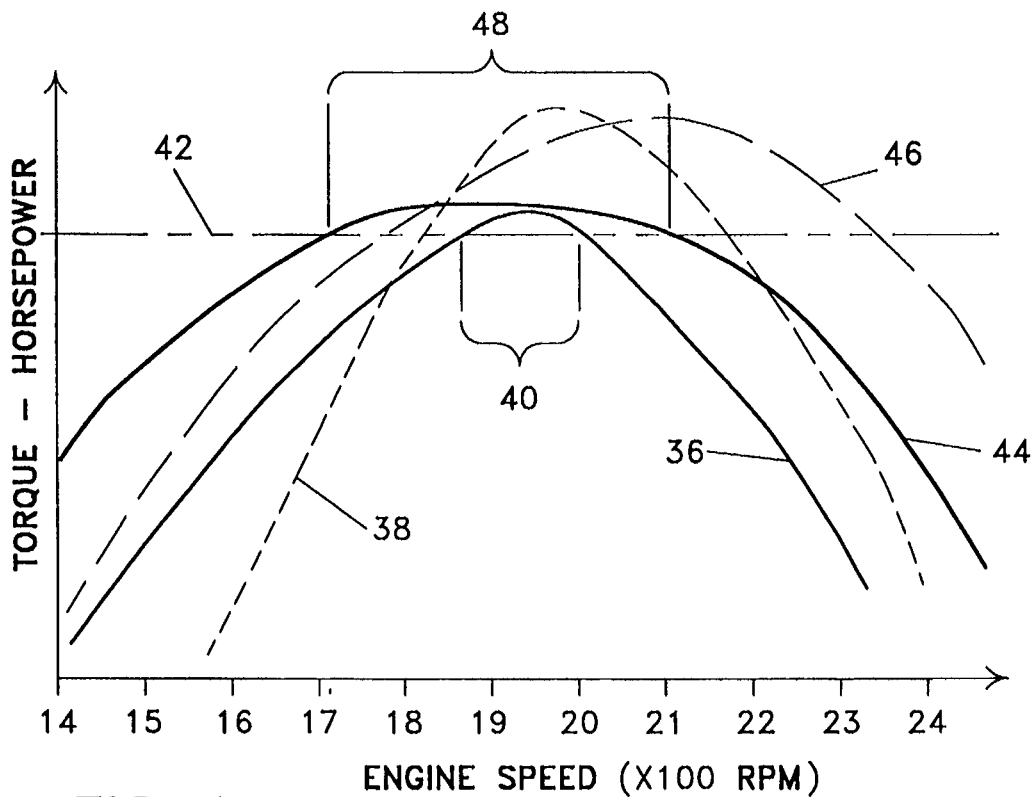
FIG. 1 is a graph showing two curves of torque versus engine speed (RPM), which illustrate differences between certain older and newer engines for off-road vehicles.
FIG. 3 is a chart indicating the pattern of solenoid energization associated with each gear of a particular powershift transmission having twelve forward gears and two reverse gears.

FIG. 3 is a table showing the solenoids which must be energized in order to engage each gear of the Fuji-Tekko model EW-16 transmission used in the prototype heavy-duty tractor system of the present invention. This prototype system forms the basis for the present disclosure, but those in the art should appreciate that powershift transmission made by other companies operate on similar principles, thus the discussion herein is equally applicable to other powershift transmissions. In powershift transmission 64, there are eight clutch packs which are each controlled by a solenoid-actuated hydraulic valve. Reading left to right in Table 290 of FIG. 3, the solenoids are labeled Y, Z, X, W, V, T, S and Q and a column of the table is associated with each solenoid. The rows indicate the direction (forward or reverse) and the gear of the transmission (from one to twelve). Table 290 shows that placing the transmission in first gear reverse requires energization of solenoids Y, V, and S, as indicated by the "X" found in each of those columns. Table 290 shows that each direction and gear has a unique combination of three solenoids which must be energized in order to select that direction and gear. The construction and operation of the Fuji Tekko transmission model EW 16 is documented in literature available from that company, and thus need not be further described here.

Figure 4:
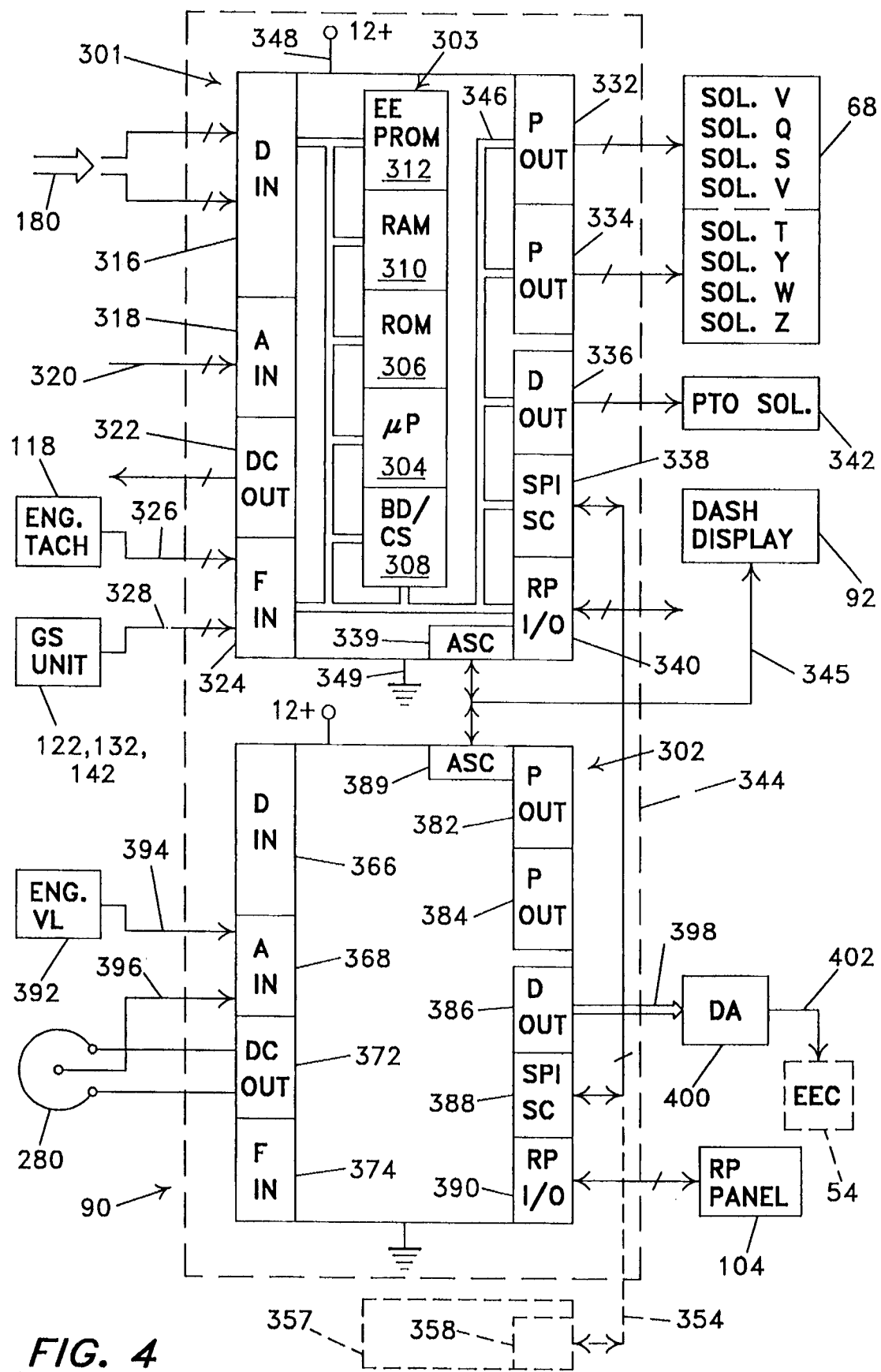
FIG. 4 is a detailed block diagram of first and second electronic controllers used within the FIG. 2 control system, and the electrical connections to and between the controllers.

FIG. 4 shows a detailed block diagram of the electronic transmission control system 90 along with selected external components from FIG. 2, which are included for ease of discussion of FIG. 4. Control system 90 may be constructed around one large microprocessor-based controller or around two or more smaller electronic controllers such as controllers 301 and 302, which may be of substantially identical construction. To the extent that certain functional features of the controller 301 or 302 are not utilized in a given application, the controller may be reduced in cost by simply not providing those circuit components or integrated circuit chips which are not required for that application.

Controller 301 includes a microcomputer 303 formed by a microprocessor 304 with a suitable time base such as a crystal oscillator, random access memory (RAM) 310, a bus driver/chip select (BD/CS) circuit 308 read-only memory (ROM) 306. A non-volatile read-write memory is also preferably provided in the form of an electrically erasable, programmable read-only memory (EEPROM) 312. Further, controller 301 includes buffered digital input circuits 316 which read the state of the various operator interface devices connected to electrical path 180 in FIG. 2. Controller 301 also includes analog-to-digital input circuits 318 which convert the incoming analog signal on line 320 to digital form, and filtered DC power output circuit 322 to provide a regulated source of power for certain analog circuit devices. The controller 301 also includes a frequency input circuit 324 which receives pulsating waveform signals on conductors 326 and 328 from the engine tachometer sensor 118 and a ground speed unit respectively. The ground speed unit may be any one of the three sensors 122, 132 or 142 described above in FIG. 2. If desired, more than one ground speed input may be utilized. This may be useful, for example, in order to monitor wheel slippage in tractor applications by comparing apparent ground speed from sensor 122 with a true ground speed as determined by sensor 132 or 142.

Controller 301 has power output ports 332 and 334 which each drive four of the solenoids of solenoid group 68 shown in FIG. 2. Although not shown, output circuits 332 and 334 preferably include a low value shunt resistance through which the current to each solenoid passes, in order to produce an analog voltage proportional to the current, which is then monitored as an analog input signal by A/D circuit 318. As is well-known, such a technique is useful for monitoring the solenoid driven circuits 332 and 334 for short circuit and open circuit conditions. Controller 301 may include additional digital outputs such as output port 336, high-speed synchronous serial communications output port 338, low-speed asynchronous serial communications port 339 and reprogramming panel input/output ports 340. The power output port 336 may drive additional power devices, such as solenoid 342 used to engage the power takeoff clutch of transmission 64. The serial communications port 338 is used to communicate with a similar serial communications port found on controller 302 via electrical path 344. The serial communications port 339 communicates via electrical path 345 to the dash display 92. Controller 301 and 302 may each be constructed about a Motorola Model No. MC68HC11 series microcontroller. That microcontroller includes a high-speed synchronous peripheral interface (which operates between 50K baud and 1M baud) that can be used for port 338, and a universal asynchronous receiver transmitter port that can be used for port 339.

Internally, suitable data, address and control buses are provided to interconnect the I/O ports or circuits with the microcomputer 303. (These are represented by electrical path 346). Suitable power connections to controlled power unit 102 are made at terminals 348 and 349 and if desired, the vehicle battery voltage may be monitored using the conventional techniques. The internal construction of controller 301 is described in detail in co-pending patent application Ser. No. 07/700,629.

As shown at the bottom of FIG. 4, additional controllers such as controller 351, the top of which is shown in phantom, may be interconnected through serial communications ports such as port 358 to the other controllers. This further electrical connection is represented by line 354 connected to serial communications SPI port 358. Controllers 302 and 351 may be identical or substantially similar to controllers 301. As will be further explained, all information required to allow two or more controllers to operate in coordinated fashion may be passed bi-directionally along electrical path 345 using well-known serial communications techniques, such as those set forth in the Society of Automotive Engineers (SAE) Serial Communications Standard J1708. In this manner, the separate controllers comprising the control system can operate as one unit on a real time basis.

A primary advantage of the use of multiple controllers in a single control system 90 is that the manufacturing costs of the system 90 may be closely matched to the needs of any given application. In other words, as additional real time computing power, or as additional analog or digital I/O ports are required for a given application, one or more of the controllers 302 and 351 may be added to the control system 90 as needed. For example, in a prototype system of the present invention, using the Fuji/Tekko transmission and Cummins diesel engine, the controller 301 primarily handles the real-time control and computational requirements to operate the transmission 64, while controller 302 is principally directed toward monitoring and controlling in real-time the input and output signals from and to the electronic engine controller 54 and driving the display 92. In this manner, the overall software code required for monitoring and controlling the operation of this engine/transmission combination is divided between the controllers 301 and 302, thus enabling all functions to be performed within small real-time intervals, as described in detail below.

It is now useful to review the input and output devices hooked up to controller 302, as shown in FIG. 4. The controller 302 has provisions for digital and analog input and output (I/O) circuits or ports 366–390 which correspond to the same types of inputs and outputs found in controller 301 (with the difference in reference numerals being 50). Since I/O circuits 366, 374, 382 and 384 are not used, these may be simply not provided in controller 302. This is most easily done by not soldering or plugging in the components or integrated circuits required for the I/O ports.

In FIG. 4, the block 392 represents an engine reference voltage signal (VREF) being applied via path 394 to analog input circuit 368, which preferably has at least 8-bit resolution. The throttle pot 280 can also be hooked up to circuit 368 by conductor 396. It receives its filtered power from DC power section 372 of controller 302.

In the prototype system 60 of the present invention, the controller 302 sends a desired engine speed signal or command to the electronic engine controller 54 via a digital value output by port 386 over signal path 398. If engine controller 54 requires an analog rather than digital signal, this conversion can be performed by D/A converter 400. If used, the D/A converter 400 preferably has at least eight bits of resolution. The conductor 402 forms part of the wiring found in path 168 shown in FIG. 2. control system 90 and controller 54.

Figure 5:
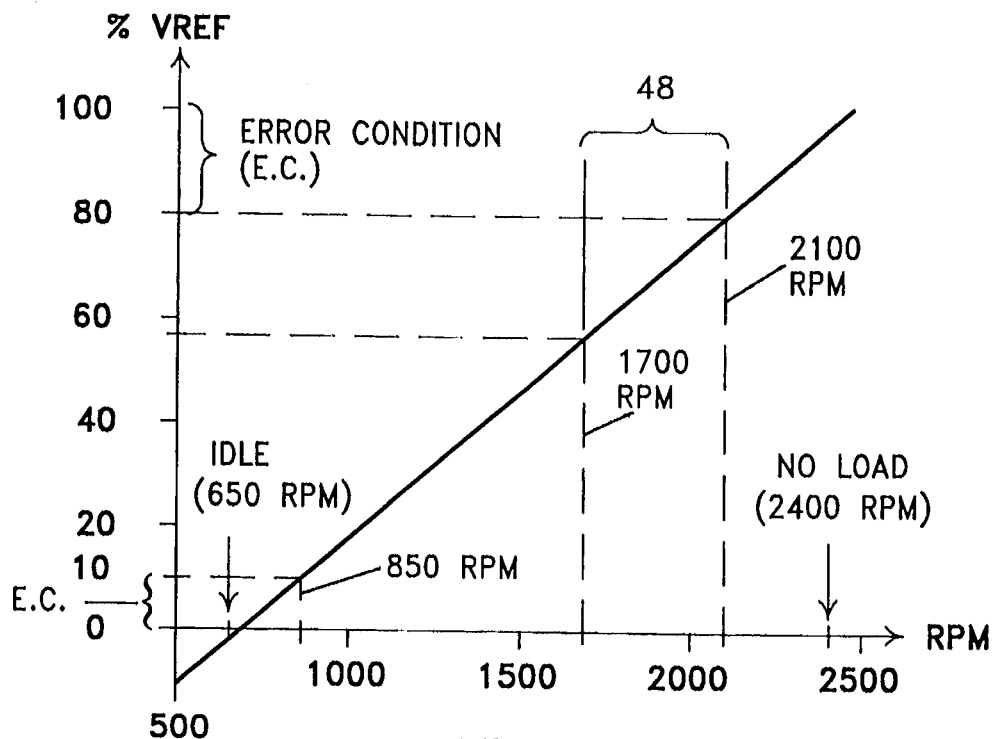
FIG. 5 is a graph of input voltage versus engine speed for a particular engine controller.

FIG. 5 illustrates the relationship between percent input voltage (VREF) and desired engine speed for the Cummins engine used with the prototype system 60 of the present invention. The analog input voltage on line 402 in FIG. 4 is interpreted as a desired engine speed command. This DC voltage level signal is supplied to the engine controller 54 as a portion of 100% of the value of the signal VREF from the engine controller 54, which is generally about 5 volts DC. This voltage signal VREF is depicted as block 392 in FIG. 4, and is monitored by analog input port 368. The normal range of engine speeds as utilized by the transmission controller is between 850 RPM and 2100 RPM, which respectively represent 10% and 80% of the VREF value. The minimum idle speed for the engine 52 is 650 RPM and the full-throttle no-load engine speed is 2400 RPM. For the control purposes described herein, it is only necessary to run the engine between 850 RPM and 2100 RPM. This provides a 20% deadband above the high value of 80% and a 10% deadband below the lower value 10% of the desired engine speed signal. Thus, the electronic engine controller 54 and controller 90, shown in FIG. 4, can monitor the voltage command signal from D/A converter 400 to ensure that there is no open circuit or short circuit conditions present.

When engine controller 54 receives a command signal 402 within 10% to 80% of the value of VREF signal, controller 54 will generally do whatever is necessary to attempt to maintain the engine speed represented by this command, within the limitations of the mechanical engine system. In general, controller 54 employs closed loop feedback by monitoring engine speed and fuel pump pressure in front of the mechanically timed fuel injectors, and adjusts fuel pump pressure to regulate engine speed. Other engine controllers may regulate engine speed in other ways, such as by varying the timing of fuel delivery through the fuel injectors while maintaining fuel pressure constant. The particular method used by the controller 54 to control engine speed is not critical, so long as engine speed can be fairly accurately and quickly controlled.

Those in the art will appreciate that other voltage levels or different control signals could be used for the desired engine speed command. For example, digital communications may be used between controllers 54 and 90. If so, the D/A converter 400 shown in FIG. 4 can be eliminated entirely and the desired engine speed can be passed as an 8-bit, 10-bit or 12-bit value with bi-directional handshaking being used to ensure the integrity of the transfer of such information.

Figure 6:
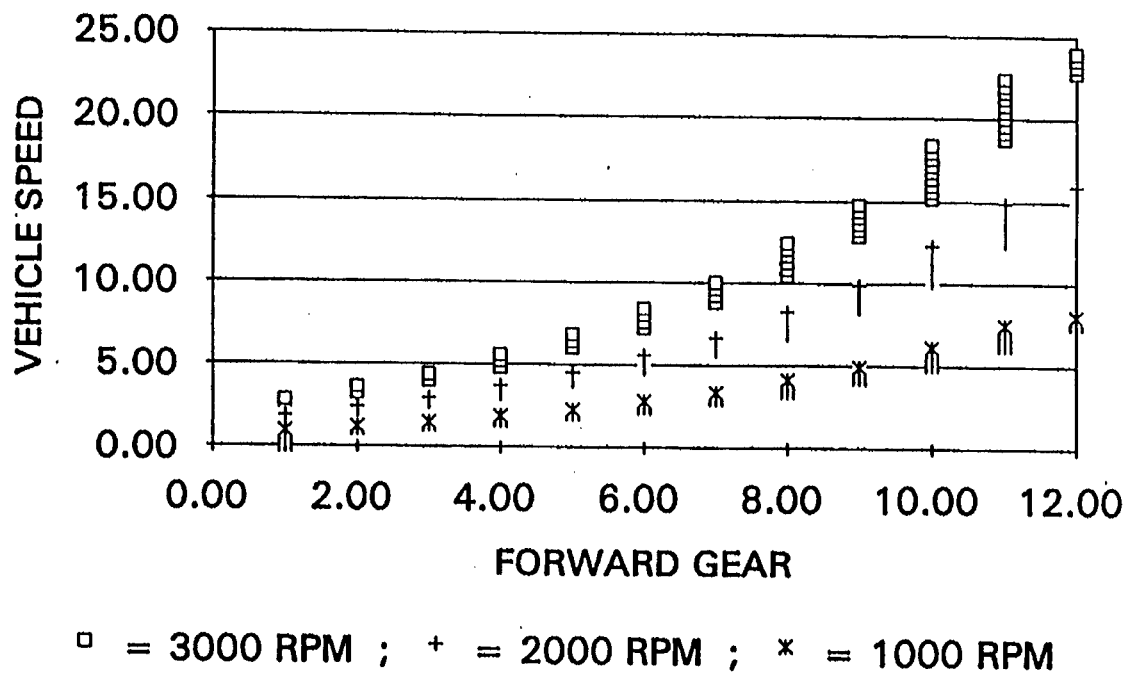
FIG. 6 is a graph depicting ground speed ranges at 1000 RPM, 2000 RPM and 3000 RPM associated with particular gears of the FIG. 2 transmission, as used for ground speed matching purposes.

FIG. 6 shows three sets of data points used in connection with the ground speed matching function of the prototype system 90 of the present invention. The "asterisk" symbols represent 1000 RPM data points for each of the twelve forward gears, the "plus" symbols represent data points for 2,000 RPM engine speed for the twelve forward gears, and the hollow boxes represent the data points for 3,000 RPM engine speeds in the forward gears. As previously explained, ground speed matching is preferably utilized whenever the transmission is disengaged momentarily, then reengaged while the vehicle is still moving. If a load is present on the vehicle or if the disengagement lasts sufficiently long, the actual vehicle speed or the actual engine speed or both will change, typically by decreasing. However, engine speed may increase if disengaging the transmission removes a load from a drooping engine and the engine speed command signal is not reduced. In such circumstances, the engine, if not already at the desired speed, will rapidly begin to increase in speed. As noted earlier, re-engagement of the same transmission gear will result in a jolt noticeable to the operator if the transmission output shaft 68 is not matched, taking the gear ratio of the transmission 64 into account, to the speed of transmission input shaft 62. If this happens suddenly, which is normally the case, high transient forces are experienced through the engaging gears and associated shafts and clutch packs of the transmission, which results in wear and tear on the transmission and the engine.

Automatic ground speed matching by a transmission controller avoids such jolts to a large degree by matching up as closely as possible the current engine speed with the ground speed, while taking the transmission gear ratio into account. This technique provides for the least energy transfer through the transmission due to the differences in rotation speeds of the input and output shafts of the transmission shaft. The graph in FIG. 6 shows the preferred gears in which to engage the transmission at 1,000, 2,000 and 3,000 RPM. The shape of a curve connecting the centers of the 3000 RPM data points is nonlinear from the first gear through the twelfth gear. Note that the shape of the curves for 2,000 RPM and 1,000 RPM data points are similar to and generally linearly proportional to the 3,000 RPM curve. Accordingly, in the control system 90 of the present invention, only one set of values need be stored for each gear, preferably the two values representing the highest and lowest vehicle speeds for the box of 3,000 RPM data points from that gear. From these twelve sets of stored values, values for other RPMs are computed through interpolation on the fly as required to determine into which gear the transmission should be placed for ground speed matching as the transmission is re-engaged by the operator. In particular, the desired gear for the 3,000 RPM value is stored in a look-up table accessed by vehicle speed. Thus, if the engine is operating at 1,000 RPM and the vehicle speed is 5.5 miles an hour, this vehicle speed will be multiplied by three to obtain 16.5 miles an hour as the vehicle speed with which to access the table. Then the look-up table will be accessed, and the value stored for that vehicle speed will indicate that the transmission should be shifted to tenth gear for re-engagement of the clutch, so this action will be carried out. The particular manner of when this procedure is carried out will be explained further in connection with the flowcharts beginning at FIG. 11.

The transmission control system 90 operates the drive system 50 in a conventional run mode, known as the "Pulser" mode, and in three new modes of operation, known collectively as the "ground speed" (GS) modes. The simplest of the three GS modes is the "comfort" mode which simply maintains the actual ground speed as close as practical to the desired ground speed selected by operator, while at the same time reducing the number of transmission shifts by varying the engine speed as necessary to compensate for changing loads. The other two GS modes are "maximum horsepower" GS mode and the "fuel economy" mode, which will be described shortly.

In the pulser mode, an operator selects a desired gear and a desired throttle speed for the engine. This is done by using the transmission shift lever 242 and the engine throttle lever 100. After selecting the pulser mode with selector switch 226, the operator uses the shift lever 242 to select the desired gear he wishes to operate in. Thereafter (or before) he also selects the desired engine speed. Those in the art will appreciate that the selection of a gear and a particular engine speed effectively selects the ground speed, which can be calculated once the gear and engine speed is known and any wheel slippage is taken into account. In the pulser mode, the selected transmission gear will not be automatically changed, but instead will remain in the same gear even as the engine is severely lugged down.

Figure 7:
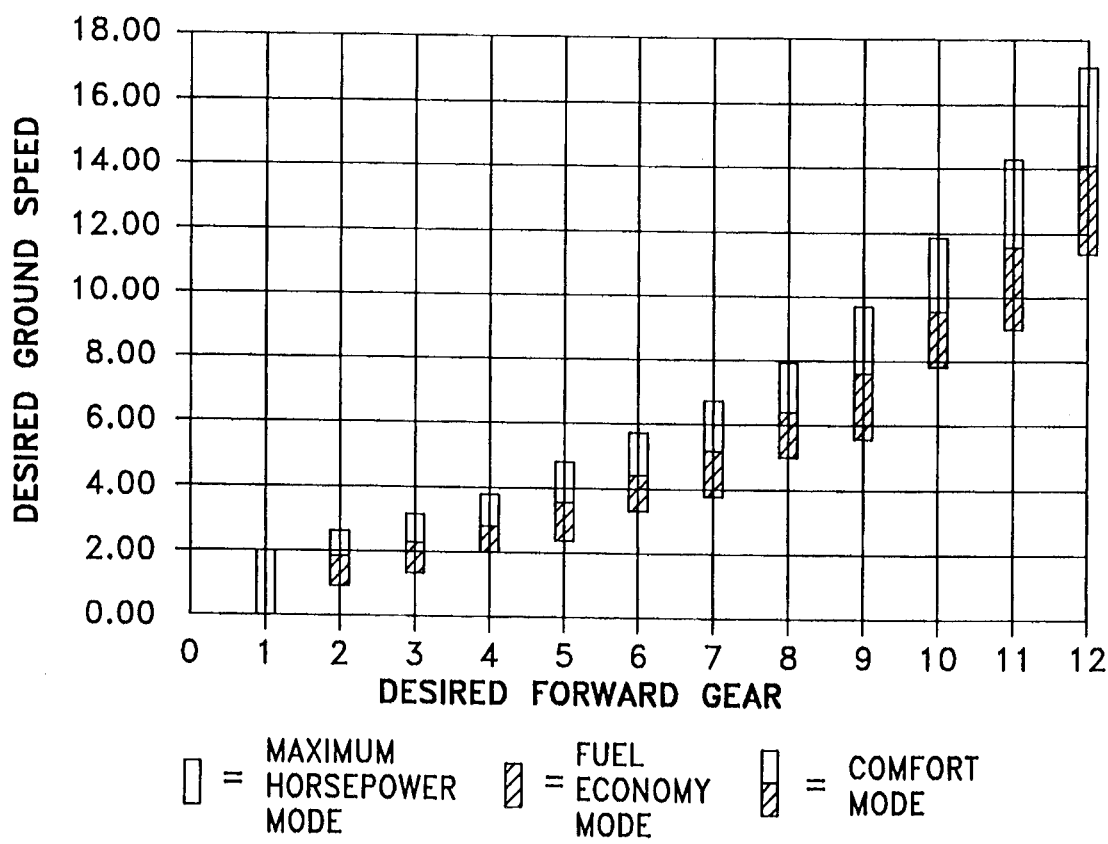
FIG. 7 is a graph showing desired ground speed (in miles per hour) versus desired forward gear in maximum horsepower mode and fuel economy mode for the FIG. 2 transmission.

FIG. 7 is a graph which helps illustrate the three new modes of operating or running an engine-transmission combination, which we call "ground speed" (GS) modes or "variable ground speed" (VGS) modes. The word "variable" is used because the vehicle ground speed may be varied by controller 302 by adjusting the engine speed command (via signal 402, independent of lever 100 and pot 280). As will be further explained later, the throttle lever 100 setting acts as a master regulator or governor and limits the maximum engine speed allowed by controller 302.

The control system 60 also has another run mode which is a conventional one, known as the "pulser" mode. The basic mode the control system 90 is to operate in, either GS or pulser, is selected by selector switch 226 shown in the FIG. 2 block diagram. The pulser mode will now be briefly explained. Those in the art will appreciate that the selection of a gear and a particular throttle speed effectively selects the ground speed, which can be calculated once the gear and engine speed is known (and any wheel slippage is taken into account). In the pulser mode of operation, the tractor runs at a substantially fixed rate of speed (constant engine speed) at a certain gear, both of which are selected by the operator. If the load or terrain conditions for the off-road vehicle are such that this is not possible, due to excessive loads on the engine, then the engine will lug down or even stall, since the transmission will remain in the gear selected by the operator.

The new ground speed modes are each distinctly different from the pulser mode. This is because in each GS mode, neither the transmission gear nor the engine speed is fixed, but rather can vary as needed in order to maintain some other parameter or set of conditions of the engine/transmission combination in or near some desired state. In the present invention, there are three parameters or conditions which can be selected as being of primary importance that are to be held in or near some desired state. This is done via the power mode selector switch 224 shown in FIG. 2 which has three positions, namely comfort, maximum horsepower and fuel economy. When switch 224 is in the comfort position and run mode switch 226 is in the GS position, the control system 90 attempts to keep the tractor at a constant ground speed by varying the engine speed and if necessary the selected gear to maintain the desired ground speed. Specifically, the band of ground speeds in which the engine will operate for any given gear is indicated by the combined speed range of hollow and hatched rectangles for each gear shown in FIG. 7.

When selector switch 224 is in the "MAX HP" position and selector switch 226 is in its "GS" position, control system 90 attempts to maintain the desired ground speed while running the engine transmission combination in a gear and at an engine speed which produces the useful maximum horsepower for the task at hand. Specifically, the band of ground speeds on which the drive system 50 will operate for any given gear is indicated by the hollow rectangle for each gear shown in FIG. 7. Those in the art would appreciate that this technique of operating the control system 60 results in the maximum available amount of power being extracted from the drive system 50 of the off-road vehicle. In this mode of operation, engine speed and if necessary the selected gear are varied as needed. Also, the ground speed may vary somewhat if the load becomes sufficiently high as to require the control system 60 to shift into a lower gear in order to handle a large load being presented to the drive system by the load and/or terrain to which the vehicle is subjected.

When selector switch 224 is in its "fuel economy" position and selector switch 226 is in its GS position, the control system 90 operates drive system 50 so as minimize fuel consumption. This mode of operation is useful when the off-road vehicle, such as tractor, is relatively lightly loaded and is being used for an application where a reasonable constant speed must be maintained. The control system 90 selects the gear and engine speed so as maximize fuel economy. This is accomplished for any given ground speed by operating the drive system 50 in the gear specified by the hatched rectangles of FIG. 7. In general, the fuel economy GS mode results in the selection of a relatively high transmission gear so the engine may be run at lower RPMs than it does when the maximum horsepower run mode is selected. As in the maximum horsepower mode, there may be situations in which control system 60 cannot maintain the desired engine speed while also optimizing fuel economy. In those situations, the control system 90 is programmed in the comfort mode to automatically attempt to maintain ground speed by downshifting and increasing engine RPM. Any deviation from optimal gear and engine speed can, if desired, be displayed on dashboard console 92.

To summarize, vehicle operation in any of the GS run modes results under most conditions in a fairly uniform operating speed in the same gear. However, if the inclination, type of terrain or loads vary such that the desired ground speed cannot be maintained, the control system 90 will automatically adjust the throttle of the engine as needed and also will upshift or downshift the transmission in an effort to maintain the actual ground speed as close as possible to the desired ground speed. To accomplish this in any of the GS modes, the system 90 varies the desired engine speed signal provided to the engine controller 54 as necessary to maintain the desired ground. If increasing the desired engine speed signal to its maximum allowed value fails to increase the actual ground speed (which happened when the engine is lugged down or overloaded), then the system 90 will downshift the transmission 64 to obtain greater overshift power at the driven wheels of the vehicle. This highly automated way of operating a tractor is believed to be very helpful in reducing operator fatigue, especially in situations where the operator is behind the wheel for hours. Further, it is believed that all but the most highly trained and sophisticated operators would not be able to maintain an off-road vehicle operating at either maximum fuel economy or maximum horsepower for extended periods of time. Thus, both of these GS run modes are believed to be quite beneficial. For example, the fuel economy mode may save significant amounts of fuel over the course of a day's operation. Similarly, operating in maximum horsepower mode may enable a farmer faced with an approaching rainstorm to complete the plowing of a field in a minimum amount of time. The comfort mode is useful when working in situations where the demands placed on the off-road vehicle vary considerably and frequent automatic shifting is undesirable.

For example, a farmer plowing a somewhat hilly terrain or a field with varying soil conditions may not want his tractor constantly shifting gears. The comfort mode helps avoid this by allowing the transmission to operate over a broader range of engine speeds in each gear, thus significantly reducing the number of shifts which are needed. This makes the ride smoother and therefore more comfortable for the operator, and also helps reduce wear and tear on the transmission and attached implements since they are subjected to a steadier pulling force.

The GS run modes are preferably entered and operated as follows. First the operator turns selector switch 226 to its GS position and selects the power mode that is maximum horsepower, comfort or fuel economy, via selector switch 224. Then the operator uses shift lever 242 to dial in the desired ground speed on display 204 of dashboard console 92. The number in the display 204 automatically increments as long as the shift lever is held in its up position and decrements as long as the shift lever is held in its down position. When the number displayed reaches the desired ground speed, the operator releases the spring-loaded shift lever 242, which returns by itself to its center position. The desired ground speed and selected power mode is used by control system 90 to determine in which gear and at what engine speed the vehicle is to run. Then, the operator places the direction lever 232 in the forward position and releases clutch pedal 112 to begin vehicle movement in first gear forward. The engine speed remains at the speed selected by throttle lever 100 until the clutch pedal is fully released, as determined by the actuation of top switch 274 of clutch pedal 112. The maximum engine speed allowed in any of the run modes (pulser or ground speed) is determined by the pot 280. Normally the operator wants the vehicle to reach the desired speed quickly and thus throttle lever 100 is moved to its full speed setting and left there. Once this is done, the control system 90 immediately regulates the desired engine speed signal to accelerate the vehicle through each successive gear until the desired ground speed is achieved. Note that if the throttle lever 100 is set at less than full power (100%) setting, such as 95% setting, the control system 90 will operate normally, except that the highest actual engine speed will not be allowed to exceed this 95% value, as determined by the graph illustrated in FIG. 5.

The control system 90 stores the automatic shift points in its reprogrammable non-volatile memory 312. Exemplary shift points are shown in Tables 1 and 2 below. Table 1 shows the automatic shift points (in miles per hour) used when selector switch 224 is in its maximum horsepower position and the run mode switch 226 is in its GS position.

TABLE 1

AUTOMATIC SHIFT POINTS FOR
MAXIMUM HORSEPOWER RUN MODE

| Gear | Maximum Speed | Upshift Speed | Downshift Speed |
|---|---|---|---|
| 1 | 2.04 | 2.04 | . . |
| 2 | 2.45 | 2.45 | 1.98 |
| 3 | 3.02 | 3.02 | 2.44 |
| 4 | 3.69 | 3.69 | 2.99 |
| 5 | 4.43 | 4.43 | 3.59 |
| 6 | 5.46 | 5.46 | 4.42 |
| 7 | 6.50 | 6.50 | 5.26 |
| 8 | 7.79 | 7.79 | 6.31 |
| 9 | 9.59 | 9.59 | 7.77 |
| 10 | 11.75 | 11.75 | 9.51 |
| 11 | 14.10 | 14.10 | 11.42 |

TABLE 1-continued

AUTOMATIC SHIFT POINTS FOR
MAXIMUM HORSEPOWER RUN MODE

| Gear | Maximum Speed | Upshift Speed | Downshift Speed |
|---|---|---|---|
| 12 | 17.34 | . . | 14.04 |

Table 2 shows the automatic shift points (in miles per hour) used by control system 90 when selector switch 224 is in its fuel economy position and run mode selector 226 is in its GS position.

TABLE 2

AUTOMATIC SHIFT POINTS FOR
MAXIMUM FUEL ECONOMY RUN MODE

| Gear | Maximum Speed | Upshift Speed | Downshift Speed |
|---|---|---|---|
| 1 | 1.65 | 1.65 | . . |
| 2 | 1.98 | 1.98 | 1.51 |
| 3 | 2.44 | 2.44 | 1.86 |
| 4 | 2.99 | 2.99 | 2.29 |
| 5 | 3.59 | 3.59 | 2.75 |
| 6 | 4.42 | 4.42 | 3.38 |
| 7 | 5.26 | 5.26 | 4.02 |
| 8 | 6.31 | 6.31 | 4.83 |
| 9 | 7.77 | 7.77 | 5.95 |
| 10 | 9.51 | 9.51 | 7.27 |
| 11 | 11.42 | 11.42 | 8.74 |
| 12 | 14.04 | . . | 10.74 |

Note that the values of Tables 1 and 2 correspond in general to the data points in graphs of FIG. 7. However, to the extent there is any variance, the Tables 1 and are more representative of the shift points used in the prototype system of the present invention. Note that in both Tables 1 and 2, there is overlap between the upshift speed and downshift speed for each gear.

Figure 8:
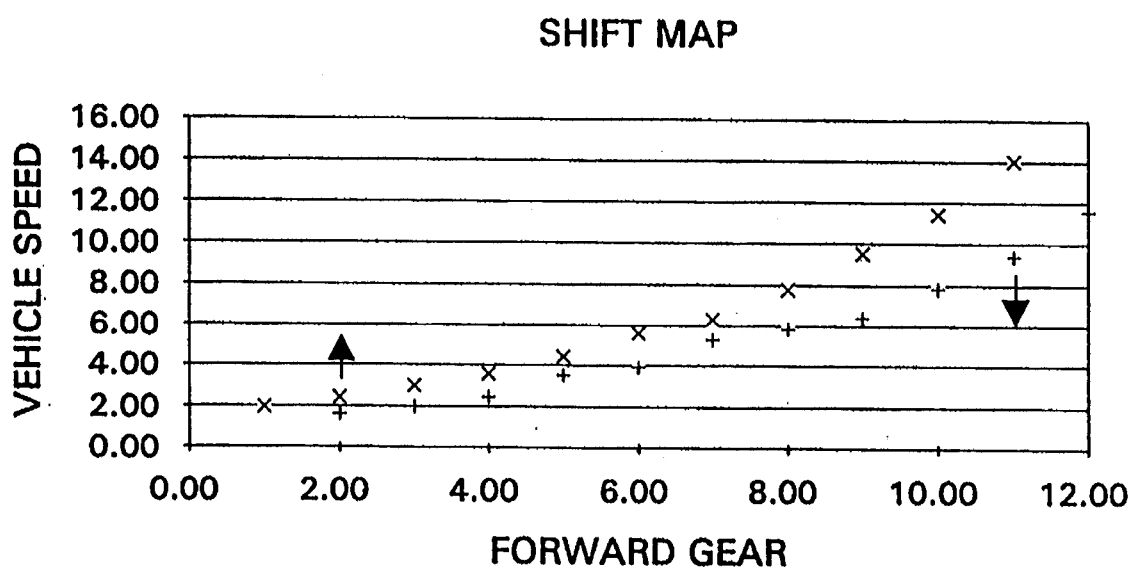
FIG. 8 is a shift map for the FIG. 2 transmission, which shows the automatic upshift and downshift points in terms of vehicle speed (in miles per hour) for each forward gear.

FIG. 8 is the shift map, that is a map of automatic upshift and downshift points for each forward gear. These points are preferably used by control system 90 when selector switch 226 is in the ground speed mode and selector switch 224 is in the comfort position. In this condition, the primary function of the control system is to maintain the actual ground at or close to the desired ground speed by automatically increasing or decreasing the desired engine speed, and if necessary, shifting to a different gear with the attendant changes as necessary in the desired engine speed command sent to engine controller 54. (Note that shift points presented in Tables 1 and 2 could, if desired, be presented in a graphical form like the shift map of FIG. 8).

The shift points shown in FIG. 8 have been selected to reduce the number of shifts required on hilly terrain or when uneven loads are placed on drive system 50, and also maximize the smoothness of shifts in the prototype drive system 60 of the present invention. In particular, the shift points have been tailored to reduce the impact of gears where multiple clutch packs are engaged. For example, as shown in FIG. 3, the shift from forward gear 6 to forward gear 7 requires the disengagement of three clutch packs operated by solenoids W, T and S and the engagement of three other clutch packs operated by solenoids Z, V and Q. Thus, additional time must be provided in order to allow such shifts to occur since the hydraulic supply system within any given transmission has finite capability. Similarly, shifts between gears 3 and gears 4 and between gears 9 and 10 require the disengagement of two clutch packs and the engagement of two additional clutch packs as shown in FIG. 3. In both situations, the clutch packs need to be given additional time to shift, so it is preferred to avoid such shifts until necessary. For this reason, the upshift point of forward gear 3, 6, and 9 have been set higher than they otherwise might. The particular upshift and downshift points which minimize jolts can be determined experimentally or through trial and error by simply varying the points and feeling the results during a test drive of the vehicle. Since the automatic shift points are stored in reprogrammable non-volatile memory, those skilled in the art can easily conduct such experimentation until a suitable smooth shifting pattern is obtained. Similar techniques may also be used to help determine variations in the shift points presented in Tables 1 and 2 to smooth out the shifting process.

Figure 9:
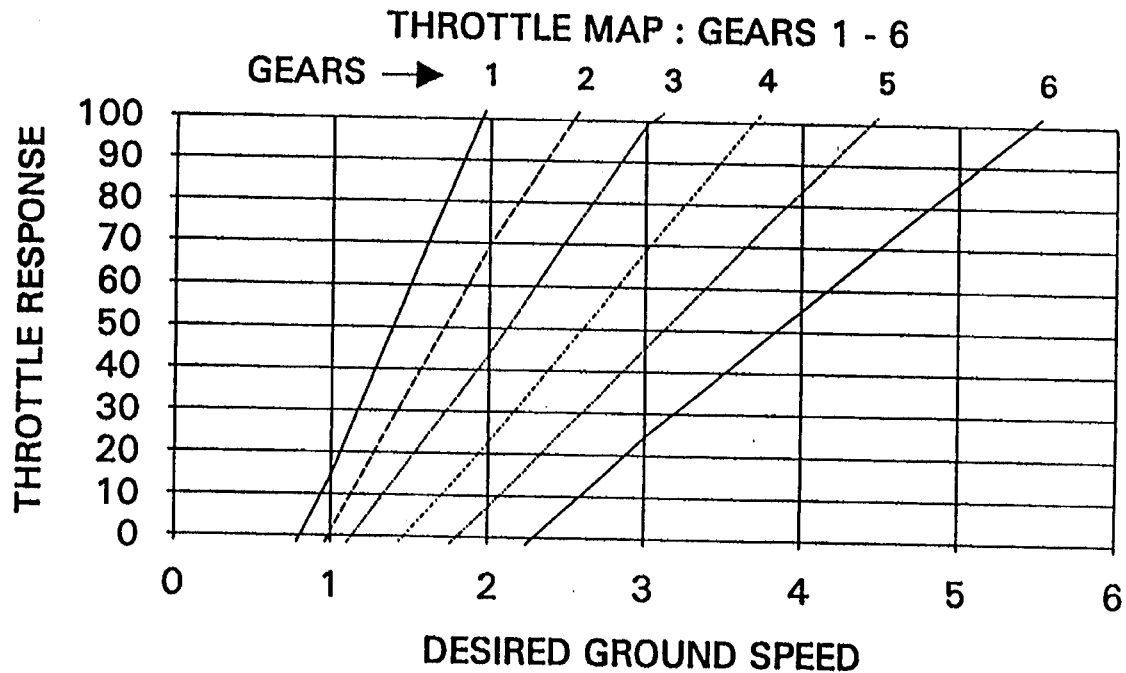
FIG. 9 is a throttle map for forward gears 1 through 6 of the FIG. 2 transmission.
Figure 10:
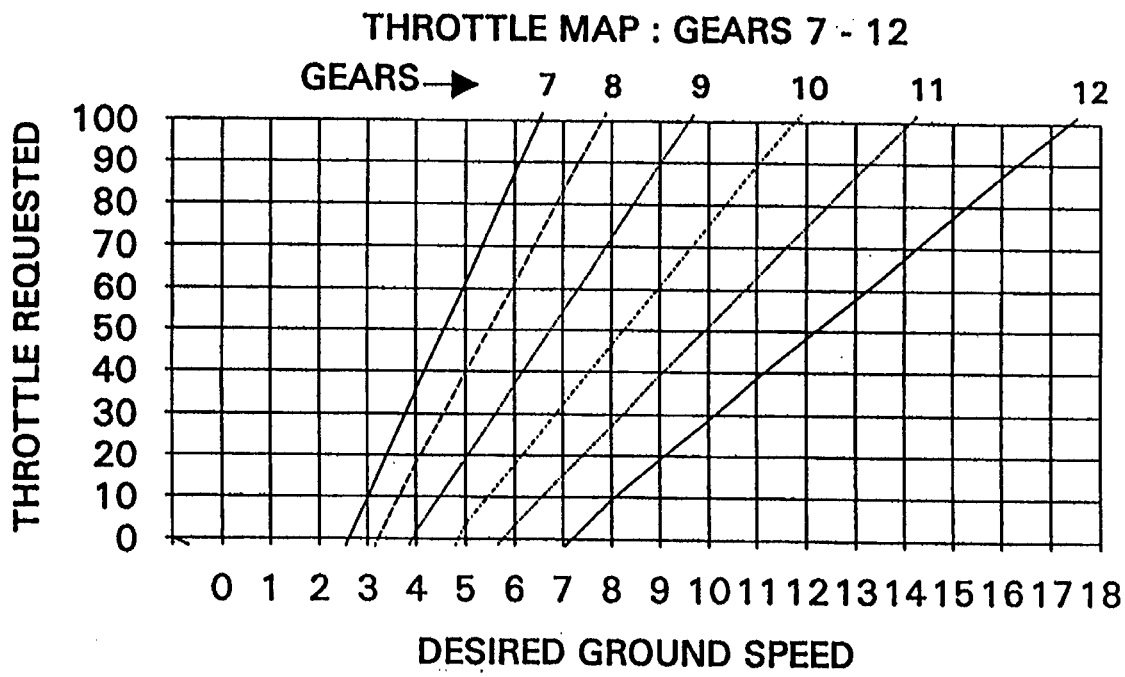
FIG. 10 is a throttle map for forward gears 7 through 12 of the FIG. 2 transmission.

FIGS. 9 and 10 show throttle maps for gears 1 through 6 and 7 through 12 respectively. In FIG. 9, the horizontal axis shows desired ground speed in miles per hour while the vertical axis shows percent throttle requested, expressed as a percent of the allowed range (10% to 80%) of the VREF signal. In other words, zero percent and 100% on the FIG. 9 vertical axis correspond to 10% and 80% respectively on the vertical axis of FIG. 5. The graphs or maps there show, for any given gear, what engine speed command signal, described earlier with respect to FIG. 5, should be sent for a given value of desired ground speed. The map of FIG. 10 provides the same information about the desired engine speed command signal for gears 7–12. The graphs shown in the maps of FIGS. 9 and 10 assume there is no wheel slippage and no droop function in the engine's performance.

The throttle map information shown in FIGS. 9 and 10 is used in the control system 90, when selector switch 226 is in its ground speed position. Specifically, it is used by the control system to determine what engine speed to request from the engine controller 54. (Note that the information in Tables 1 or 2 or FIG. 8 is used to determine what gear to place the transmission 64 in.) Since the graphs are straight lines, the information can be easily stored in formula form or in table form. How to use either form of stored information is well within the skill of those in the art and need not be further described here.

Software Aspect of Control System 90

The internal operation of electronic control system 90 as shown in FIG. 2 will now be further explained from a software and programming perspective through FIGS. 11 through 27. With the software flowcharts, the pulser transmission control sequence will be explained first with reference to flowcharts and FIGS. 11 through 19. Second, the variable ground speed control modes, namely, the comfort mode, the maximum horsepower mode and the fuel economy will be explained with reference to FIGS. 20 through 24. Finally, the pseudo-gear control mode, where the drive system appears to have more transmission gears than are actually present, will be explained with respect to FIGS. 25–27.

Upon power-up, the microprocessors of controllers 301 and 302 each go through a conventional start-up routine which includes initializing internal registers, servicing watchdog timers, checking the integrity of the stored program through a check sum procedure, initializing diagnostic codes and performing other routine procedures for starting up a microprocessor.

Figure 11:
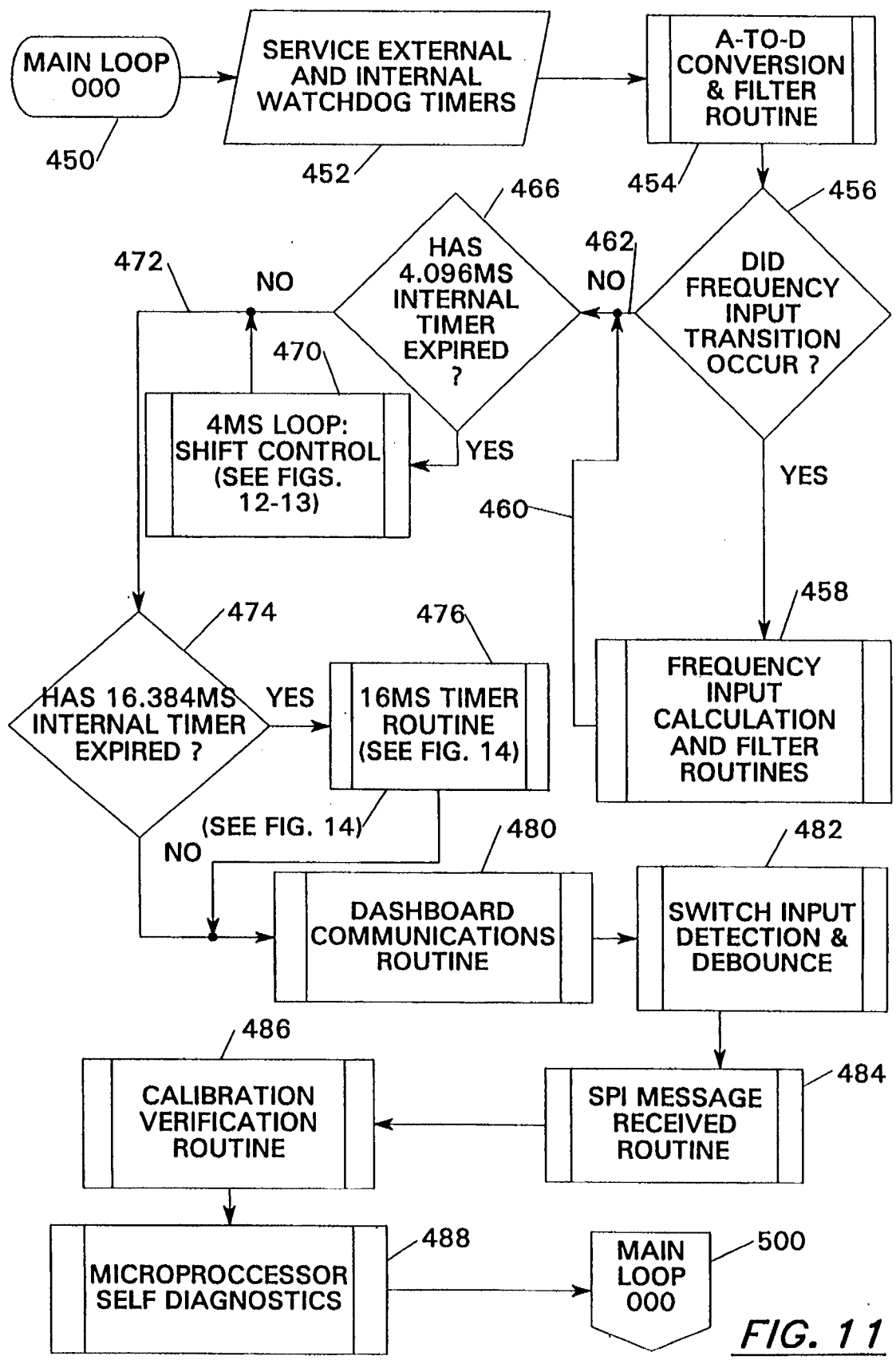
FIGS. 11 through 19 are flowcharts illustrating the software used to operate the first or transmission controller of the FIG. 2 control system of the present invention in its pulser transmission mode, where

FIG. 11 shows the main software loop that is repetitively executed by controller 301. Upon completion of the power-up routine, the start point 450 of the main loop is entered. First, the external and internal watchdog timers are serviced as indicated at action block 452. Next, analog-to-digital conversion routines 454 are performed to acquire the values of any analog inputs presented to the controller 301 at analog input circuit 318 shown in FIG. 4.

The controller 301 uses various internal timers which can be either real-time interrupt-producing hardware timers or software clocks provided in microcontroller 301. (Those in the art world appreciate that with well-designed and tested, fast-executing software code, software timers may be quite accurate and well-suited for real-time process control.)

The internal timers used in controller 301 include a 4.096 millisecond timer (about 4 milliseconds) a 16.384 millisecond timer (about 16 milliseconds), a 524 millisecond timer and a 1.048 millisecond timer. For convenience, the first two internal timers will generally be called the 4 millisecond timer and the 16 millisecond timer. As a matter of convenience, "millisecond" is at times abbreviated "MS".

In FIG. 11, decision diamond 456 asks whether a frequency input transition occurred. This is determined by checking for an interrupt caused by a signal transition being detected at input circuit 324 (see FIG. 4). The interrupt code captures the instantaneous value of the microprocessor's high-speed real-time clock, with each separate frequency input having its own memory locations in RAM for storing such instantaneous values. If an interrupt has occurred, control passes to block 458. Here, the captured time values are processed by conventional averaging routines which help filter transients to determine what an actual speed or RPM value of the analog input represents. Such calculations are based upon the well-known inverse relationship between the period and the frequency of a pulsating signal, such as the type produced by a variable reluctance sensor. Once such frequency (RPM) values are determined, they are stored in a different memory location in RAM for use by other routines.

Control then passes to the no path 462 leading to decision diamond 466. Diamond 466 asks whether the four millisecond internal timer has expired; if yes, a routine 470, namely the four millisecond loop shift control routine, is performed. This will be described in detail with respect to FIGS. 12 and 13. Control then returns to no path 472 from diamond 466 that leads to decision diamond 474, which asks whether the 16 millisecond internal timer has expired. If yes, then block 476, the 16 millisecond timer routine shown in FIG. 14 is performed, and then control passes to the dashboard communications routine 480. Routine 480 sends digital data values to dash unit 92 shown in FIG. 2, which internal controller 190 of display unit 92 promptly causes to be displayed.

Thereafter, at block 482 digital switch input values are checked and debounced, thus establishing legitimate states for any digital inputs received via input section 316 of controller 301. Meanwhile, controller 302 may have sent to controller 301 various process data such as the current value of the throttle position output as gathered from potentiometer 280 (see FIG. 4). As indicated in FIG. 11, block 484 loads such process data from controller 302 (called "frame 2" in the software) via SPI communications path 344 to controller 301 (which is called "frame 1" in the software).

Block 486 represents the various housekeeping functions performed by controller 301, like recalibrating itself with respect to DC reference values so that analog values may be correctly read when block 454 is executed a few microseconds later. Routine 486 also checks on the integrity of system parametric information stored in the EEPROM 312. Such information may include information about the engine such as the upper and lower power band RPM points in FIG.

1, and the shift times for solenoids associated with transitions from one gear to another. Lastly, at step 488, the microprocessor performs other conventional checks to ensure the integrity of the software and the controller configuration. These include refreshing the data direction of input/output ports and the time values from the EEPROM now stored in RAM, and a checking of any critical sections of code using checksum or other error-detection techniques to ensure that a transient has not somehow reconfigured some portion of memory in an undesired way. Then control passes as shown by connector arrow 500 to the start point 450 of the main loop in FIG. 11, to execute the main loop all over again.

Figure 12:
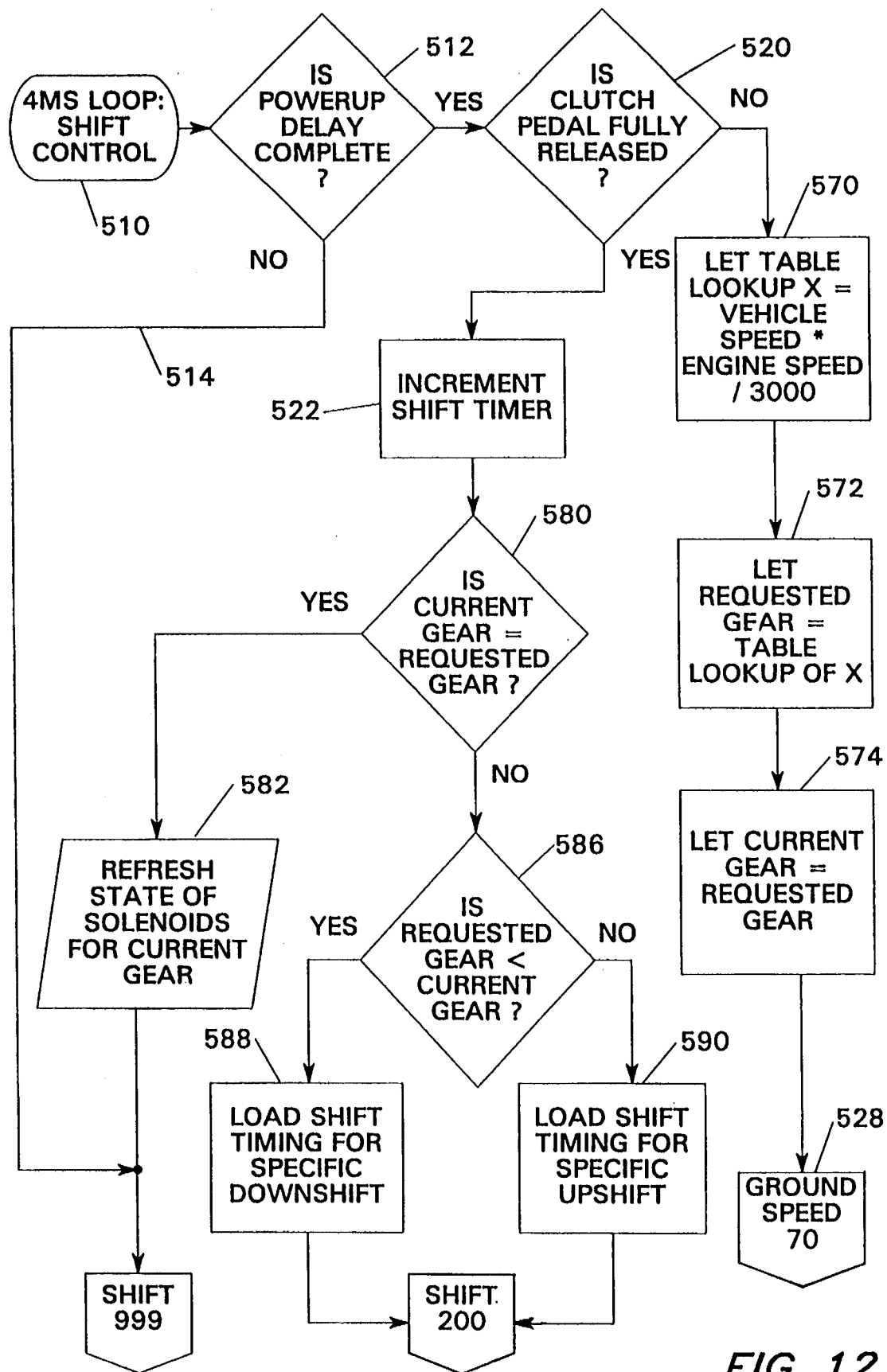
Figure 13:
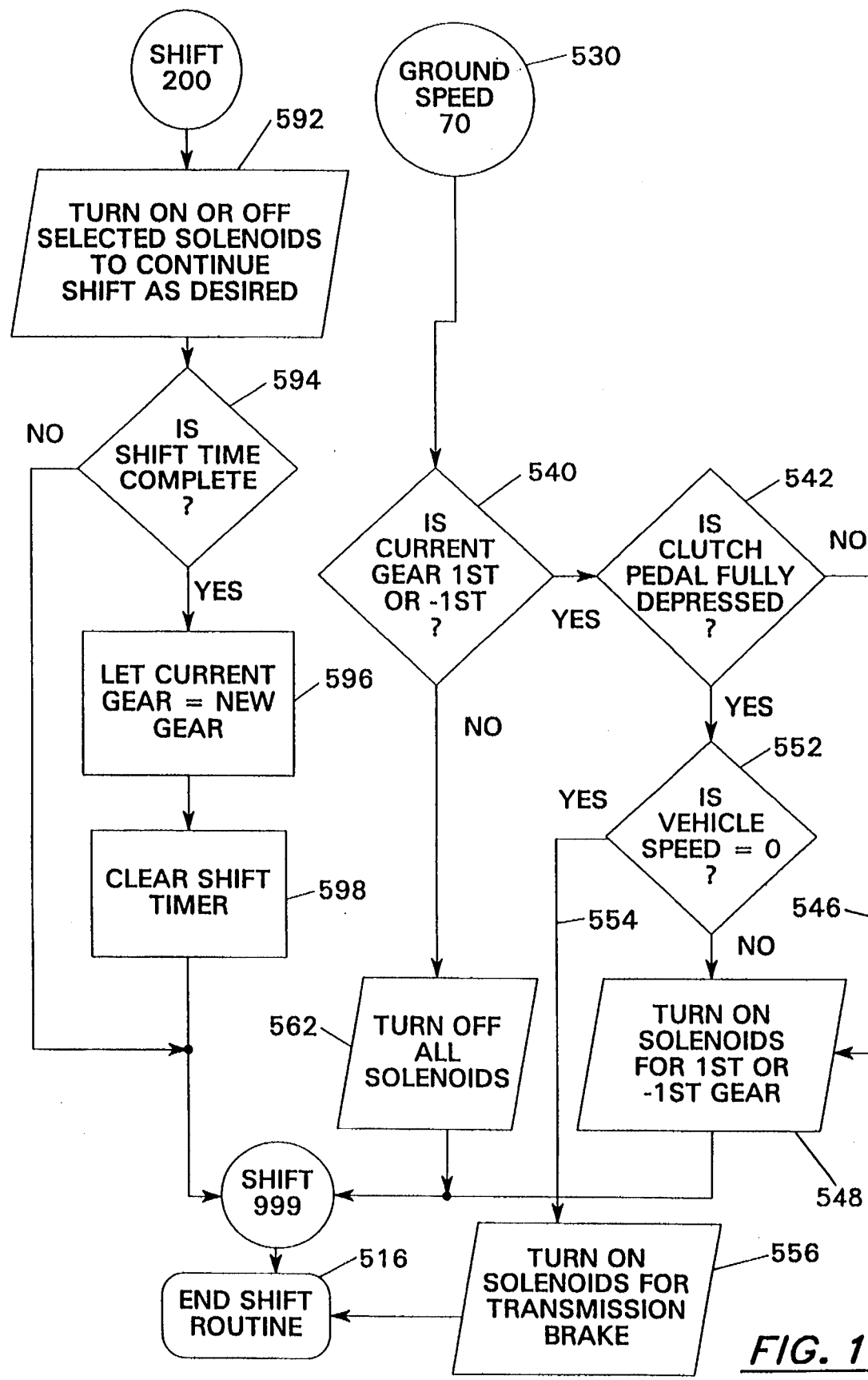
Figure 14:
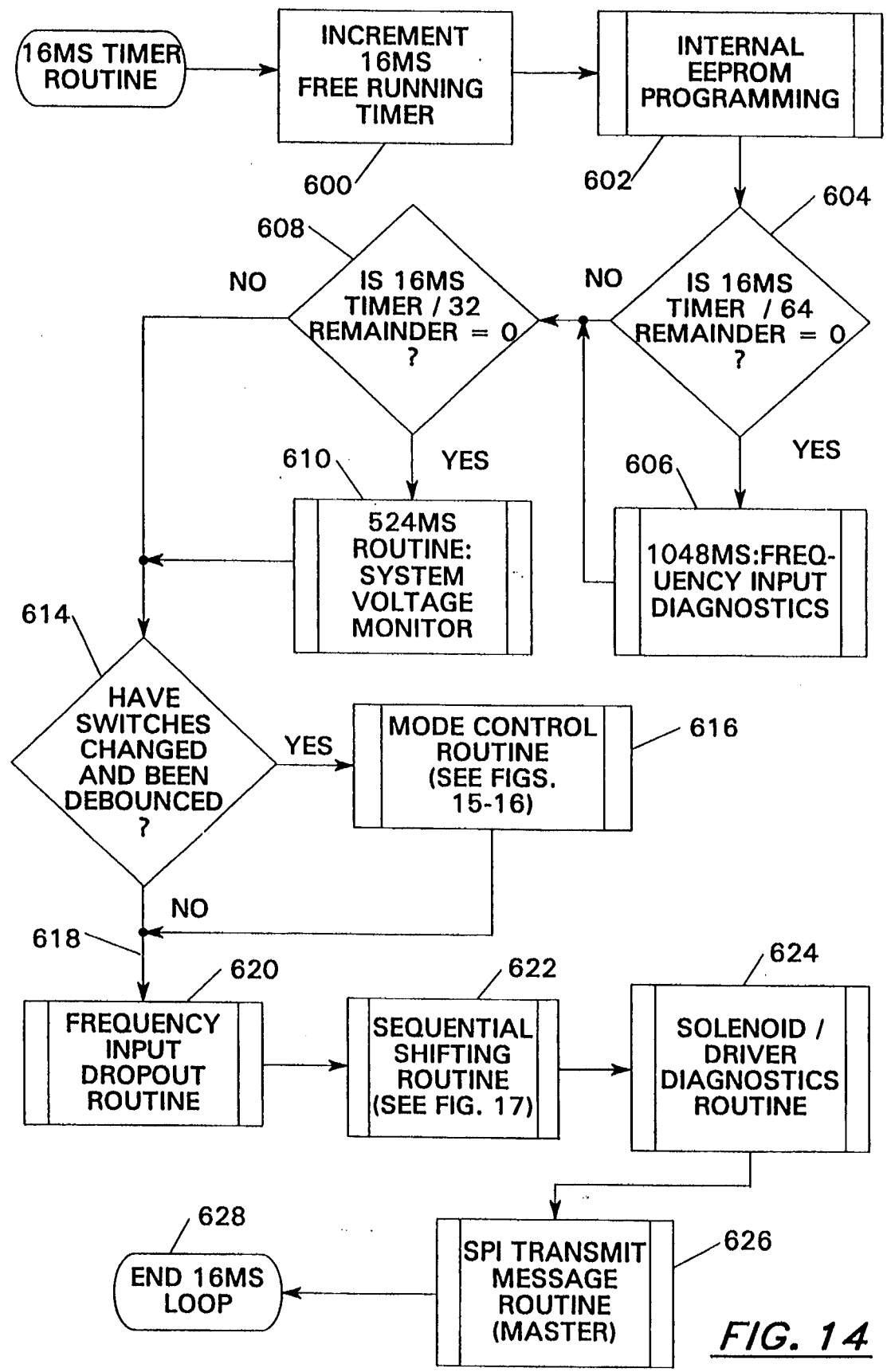

FIGS. 12 and 13 are flowcharts which describe the technique used to control the changing of gears in the powershift transmission 64. As previously explained, changing from one gear to another requires, as shown in FIG. 3, the de-energization of between one and three solenoids and the energization of between one to three solenoids. As is known in the field, the smoothness of shifts between gears in a transmission can be improved if the necessary de-energization and energization of affected solenoids are carried in a particular timed sequence. For example, to prevent the transmission from momentarily free-wheeling, it may be useful to ensure that before one clutch pack is completely disengaged, another clutch pack to be engaged is already in the process of engaging. This will minimize gear lash during shifts. Such controlled de-energization and energization of valves and clutch packs to minimize jolts and improve smoothness of shifting is well understood in the transmission art, and need not be described further from a mechanical or timing point of view. Instead, a preferred sequence of steps for carrying out such transmission shifts under software control using a microprocessor will be outlined in FIGS. 12 and 13.

Upon entering the shift control routine at start point 510, the controller 301 first checks at decision diamond 512 to determine whether a one-half second powerup delay is complete. This delay helps ensure that the mechanical and electrical conditions of the engine/transmission control system 60 have stabilized upon power-up before any physical action is ordered by control system 90. If the delay is not complete, control passes along the no path 514 to the connector arrow labeled "shift 999" that leads to the end point 516 of the shift routine shown at the bottom of FIG. 13.

When the power-up delay is complete, the yes path from diamond 512 is taken. Decision diamond 520 then inquires whether the clutch pedal 112 (shown in FIG. 2) is fully released, as indicated by switch 274 being actuated and switch 272 being released. If no, the controller 301 will check the current vehicle speed (as determined at block 458 of FIG. 11) and use it in block 570 to calculate a look-up value X to access a table of ground speed matching data specifying the proper gear required for ground speed matching for any given vehicle speed and engine speed. The functional implementation of such a table was earlier described with respect to FIG. 6 and will not be repeated here. At blocks 572 and 574, the current gear and requested gear will be set to the gear specified at the location pointed to by the value of X in the look-up table. Thereafter, the control will pass through connector arrow 528 to connector balloon 530 on FIG. 13.

In FIG. 13, decision diamond 540 asks whether the current gear is first gear, either forward or reverse. If yes, and the clutch pedal is not fully depressed as determined by decision diamond 542, control passes along path 546 to action block 548 where the solenoids required for first gear forward or first gear reverse, depending upon the direction selected, are energized. If the clutch pedal is fully depressed as determined by diamond 542, then control passes along the yes path to decision diamond 552 which checks the vehicle speed. If zero, control passes along yes path 554 to action block 556. Block 556 energizes solenoids V and T so as to prevent freewheeling of the shafts in the transmission 64 which can occur when the transmission is in neutral due to viscous coupling. Energizing solenoids V and T still keeps the transmission 64 in neutral, but stops the free-wheeling by engaging the intermediate shafts and clutch packs, but not the input shaft or output shaft. If such free-wheeling is not stopped, then a loud clunk will often be produced when the transmission is finally re-engaged. If at diamond 552, the vehicle speed was determined to be other than zero, control passes to action block 548 where the solenoids are turned on for first gear, forward or reverse, depending upon which direction has been selected (see the earlier check at decision diamond 540).

In FIG. 13, decision diamond 540 may be answered no, indicating the current gear selected by the table look-up result from block 572 (FIG. 12) was not first gear forward or reverse. If so, control passes to block 562 which turns off the solenoids. This later action is taken since at decision diamond 520 in FIG. 12, it was determined a few microseconds earlier that the clutch pedal was not fully released. To avoid a heat dissipation problem in the transmission, which can occur when the master mechanical clutch is only partially engaged, all solenoids are turned off, which takes the transmission out of gear, and allows the vehicle to coast. Control thereafter passes to the end point 516 of the shift routine.

The four millisecond shift loop control routine shown in FIG. 12 will be reentered every four milliseconds. At some point, the clutch pedal will be fully released. At that time, the yes path of decision diamond 520 will be taken to block 522 where the shift timer is incremented. Next, decision diamond 580 checks whether the current gear is requested gear. Since the ground speed matching routine modifies both the current and requested gear, the current gear will be equal to the requested gear, and the solenoids for that gear will be turned on at action block 582. In other words, upon releasing the clutch pedal, the transmission will enter the gear which most closely matches the ratio of the speed of the vehicle and the engine. At some point, the current gear may not be equal to the requested gear, meaning the operator has selected a different gear than the transmission is currently in. In that case, control passes from decision diamond 580 to decision diamond 586 which asks whether the requested gear is less than a current gear. If yes, information about the next downshift, including which solenoids will change state and the shift times or points at which such state changes are to occur for the particular downshift required, is retrieved from memory. (Shift times for each solenoid to be energized or deenergized are stored in the EPROM as numbers representing the elapsed time from the beginning of the shift to the shift point.) This action is represented by block 588. If an upshift is required, control passes to block 590, which similarly loads the solenoid state changes and shift timing for the specific upshift encountered. Thereafter, control passes along connector arrow labeled "Shift 200" to FIG. 13 and action block 592. Here, the specific shift time values are checked against the current shift timer value, and as each specific shift point time elapses, the specific selected solenoid is turned on or off as required as part of the continuing shift sequence. Decision diamond 594 checks whether the overall shift time is complete. If no, control passes through end point 516 and the shift control loop is reentered four milliseconds later. Eventually, upon repeated re-entry of the shift control routine, the answer to decision diamond 594 of FIG. 13 is yes. Then, as shown by blocks 596 and 598, the current gear is set to the new gear to which the just-completed shift sequence has switched the transmission, and the shift timer is cleared.

FIG. 14 shows the 16 millisecond timer routine. The first step performed at block 600 is to increment a counter called the "16 MS free running timer" by one. Next at block 602, any changes in parameter or other values which need to be permanently recorded in non-volatile memory (EEPROM) are made. At diamond 604, the value of the 16 MS free running timer is divided by 64 and the remainder checked to see if it equals zero. If yes, 1,048 milliseconds have elapsed since the remainder last equaled zero and frequency input diagnostics are performed at block 606. These diagnostics include checking for proper operation of ground speed indicators, by making sure the reported values are reasonably consistent with the expected ground speed and engine speed, which are known since the transmission gear ratios are known and the actual engine speed is known. If either sensor is providing out-of-range readings, an error condition mode is activated which allows the drive system 50 to function in a more limited manner without the sensor providing the questionable reading and an error code indicating same is produced for presentation on the dashboard unit 92. For example, if the ground speed sensor fails, the actual ground speed is calculated from the product of the current transmission gear ratio times actual speed times tire size times an appropriate scaling constant. The performance of drive system 50 is considered limited in that the ground speed is being derived from more indirect measurements rather than being actually measured.

Thereafter, control passes to decision diamond 608 where the 16 MS timer value is divided by 32 and the remainder is checked to see if it equals zero. If yes, then about 524 milliseconds have elapsed since the remainder last equaled zero, and the system voltage is monitored as indicated by block 610. If the vehicle supply voltage is determined to be too low, a warning message is generated on the dashboard 92 to alert the operator to the possible problem. (Under sufficiently low supply voltage conditions, the transmission solenoids may not energize properly.)

In FIG. 14, control next passes to decision diamond 614 which checks operator input switches from sets 94 and 96 as shown in FIG. 2. Once a valid change of state in any switch has been detected, the mode control routine 616 is performed once, and only once. In other words, the mode control routine is entered only when the command switches, which are operator-controlled and constitute part of the operator interface, have changed state in some way. Thereafter, control passes along path 618 to the frequency input dropout routine 620. This routine checks to determine whether the frequency of any of the frequency inputs received at frequency input circuit 324 (see FIG. 4) are so low as to result in an overflow condition in the f=1/T calculation, where f stands for frequency and T stands for the measured period. This condition corresponds to the detection of a speed that is very close to zero, and the result is recorded as zero in a memory location in RAM reserved for such frequency input values.

Next, the sequential shifting routine 622 is performed. Basically, this routine is responsible for implementing multiple shifts caused by holding the upshift switch or downshift switch energized. Specifically, such multiple shifts are performed in a predetermined amount of time on a per gear basis, like a single gear shift is, with this routine also specifying the predetermined minimum time required between shifts. The operation of this routine will be explained in detail in FIG. 17.

Next in FIG. 14 is the solenoid/driver diagnostic routine 624. This routine measures the current delivered to the solenoids by power output circuits 332 and 334 in a manner that is well-known in the art. Specifically, it checks the current levels in the solenoid driver circuit to effectively assure that no short circuits or open circuits are present. Next, block 626 initiates the transfer of information from controller 301 to controller 302 using a synchronized peripheral interface (SPI) port which is part of the Motorola MC68HC11 series microprocessor used in controllers 301 and 302. Finally, the end point 628 of the 16 MS timer routine is reached and control returns to the main routine of FIG. 11.

Figure 15:
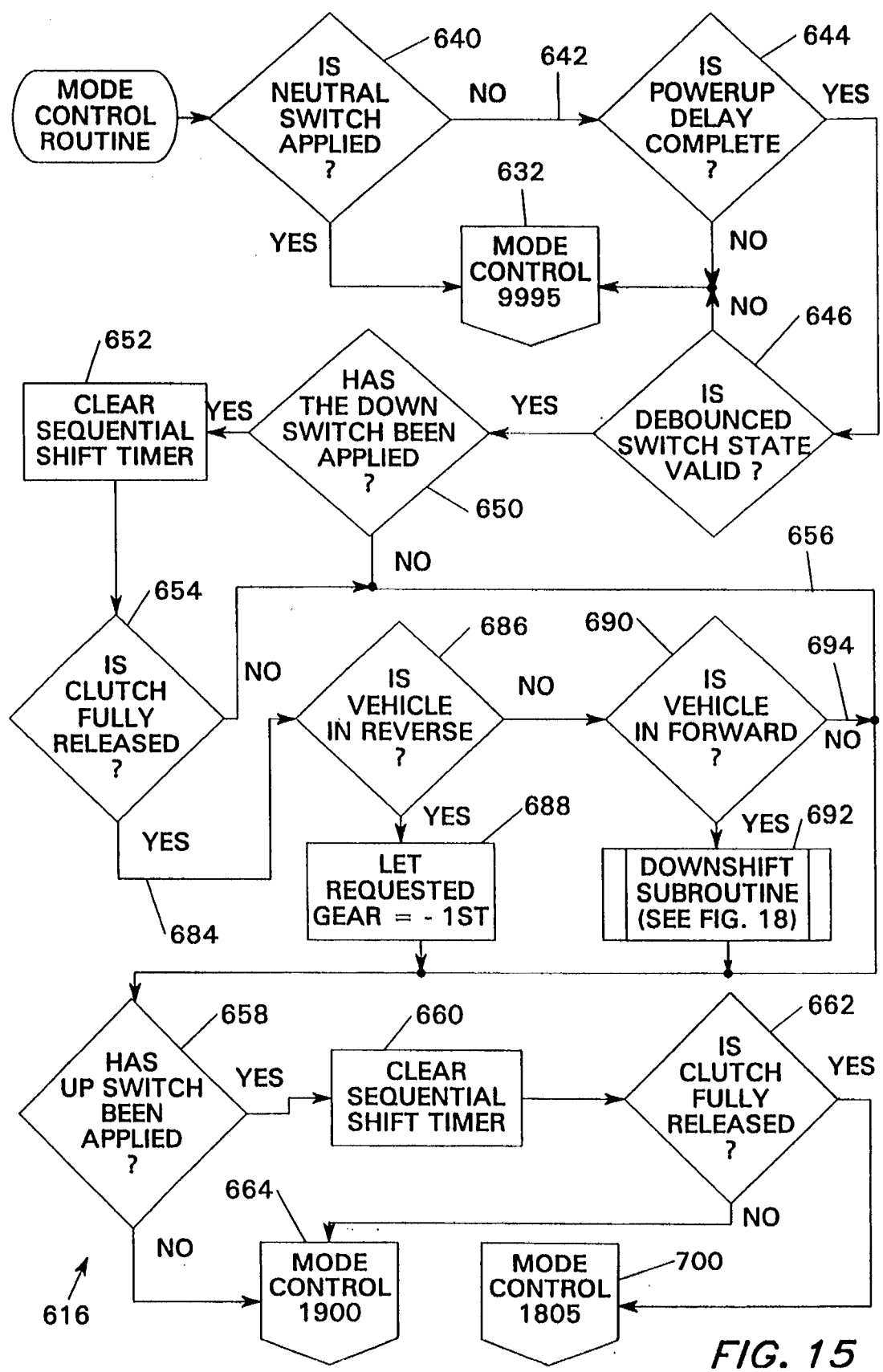

FIG. 15 shows the mode control routine 61 6 called by and forming part of the 16 MS timer routine of FIG. 14. The mode control routine 616 only responds to the transition in the state of a given switch once. If, during the next pass through the mode control routine, a switch is still in the same state, this will not cause any further action to be taken. In this regard, the routine may be said to be transition-driven rather than switch-state-driven. The routine 616 checks the state of the operator interface switch set 94 shown in FIG. 2 and other switches to establish the precise mode in which the control system 90 should be operating. Note that this control code resides in controller 301 which acts as the master controller of control system 90.

At the start of mode control routine 616, the state of the neutral switch 238 of the direction lever 232 is checked. If it is applied, the control passes via connector arrow 632 labeled "Mode Control 9995" from FIG. 15 to the bottom of FIG. 16 to entry point 634. Thereafter, action block 636 sets the mode state to neutral and turns off all transmission solenoids. Next the end point 640 of the mode control routine is reached and control passes back to path 618 of FIG. 14.

Returning to the top of FIG. 15, the "no" path 642 will be followed to decision diamond 644 if the neutral switch is not applied. This diamond checks the half-second power-up delay timer previously described with respect to decision diamond 512 of FIG. 12. If the power-up delay is complete, decision diamond 646 checks the states of all debounced switches to determine whether a valid combination of switch states exist. If not, the system enters neutral via exit arrow 632 and action block 636 shown at the bottom of FIG. 16. If the switch states represent a valid combination, the down switch 250 of switch lever 242 is checked for a transition by decision diamond 650. If the down switch 250 has been actuated, block 652 clears the sequential shift timer which will be described shortly with respect to FIG. 17. If the down switch has not been actuated, control passes along path 656 to decision diamond 658 which checks the up switch 246 of switch level 242 (see FIG. 2). If the up switch 246 has been applied, block 660 clears the sequential shift timer and control passes to decision diamond 662. If the up switch 246 has not been applied, control passes through broad arrow 664, labeled "mode control 1900" to the top of FIG. 16 and decision diamond 666.

Decision diamond 672 checks the forward switch 236 (see FIG. 2). If the direction lever 232 is in the forward position, the switch will be actuated and control will pass to decision diamond 674. If not, control will pass to decision 676 which checks the reverse switch 240 to determine whether direction lever 232 is in its reverse position. If yes, control passes to decision diamond 678 and if no, the control mode state is reached.

Returning to FIG. 15, the discussion is now directed to the "yes" path 684 extending from decision diamond 654 which is reached when the clutch is fully released. Decision diamond 686 checks whether the vehicle is in reverse. If it is, the requested gear is equal to first gear reverse since the down switch was actuated as determined by diamond 650 in order to even get to diamond 686. Thus, as stated in block 688, the requested gear is set to first gear reverse. If direction lever 242 is in its forward position, decision diamond 690 directs the control to downshift routine 692, which will further be described in FIG. 18. If the "no" path 694 is reached from diamond 690, the direction lever 242 is in its neutral position. Whether or not the vehicle is in forward, control will eventually pass to diamond 658, and if the up switch has not been applied, to FIG. 16 and to decision diamond 672 and decision diamond 674. At diamond 674, if the vehicle is determined to be stopped or moving forward or in slow reverse, the controller 301, as indicated in block 696, will let the gear requested be equal to the forward gear requested as determined in FIGS. 18 or 19, the upshift or downshift routines. Similarly, at decision diamond 676 if the reverse switch is applied, and at diamond 678 the vehicle is stopped, or moving in reverse or in slow forward, there is no harm in allowing the transmission to be shifted to the reverse gear requested as indicated by block 698 off the "yes" path of diamond 678. Either path leads to the end point 640 of the mode control at the bottom of FIG. 16.

Decision diamond 662 at the bottom of FIG. 15 inquires whether the clutch is fully released. If yes, control passes along connector arrow 700 entitled "mode control 1805" to the top of FIG. 16 and decision diamond 702. Diamond 702 asks whether the vehicle is in reverse. If yes, since the up switch was applied as determined at diamond 658, block 704 sets the requested gear equal to second gear reverse. Control will then pass through diamonds 672, 676 and 678 and block 698 to end point 640.

If at diamond 702 the vehicle is not in reverse, control passes to diamond 706 which asks whether the vehicle is in forward as determined by monitoring direction lever 232 (see FIG. 2). If yes, since the up switch was applied as determined by decision diamond 658 of FIG. 15, control passes along to the upshift subroutine 708, which is shown in detail in FIG. 19. After it is performed, control passes through diamonds 672 and 674 to end point 640 of the mode control at the bottom of FIG. 16.

Figure 17:
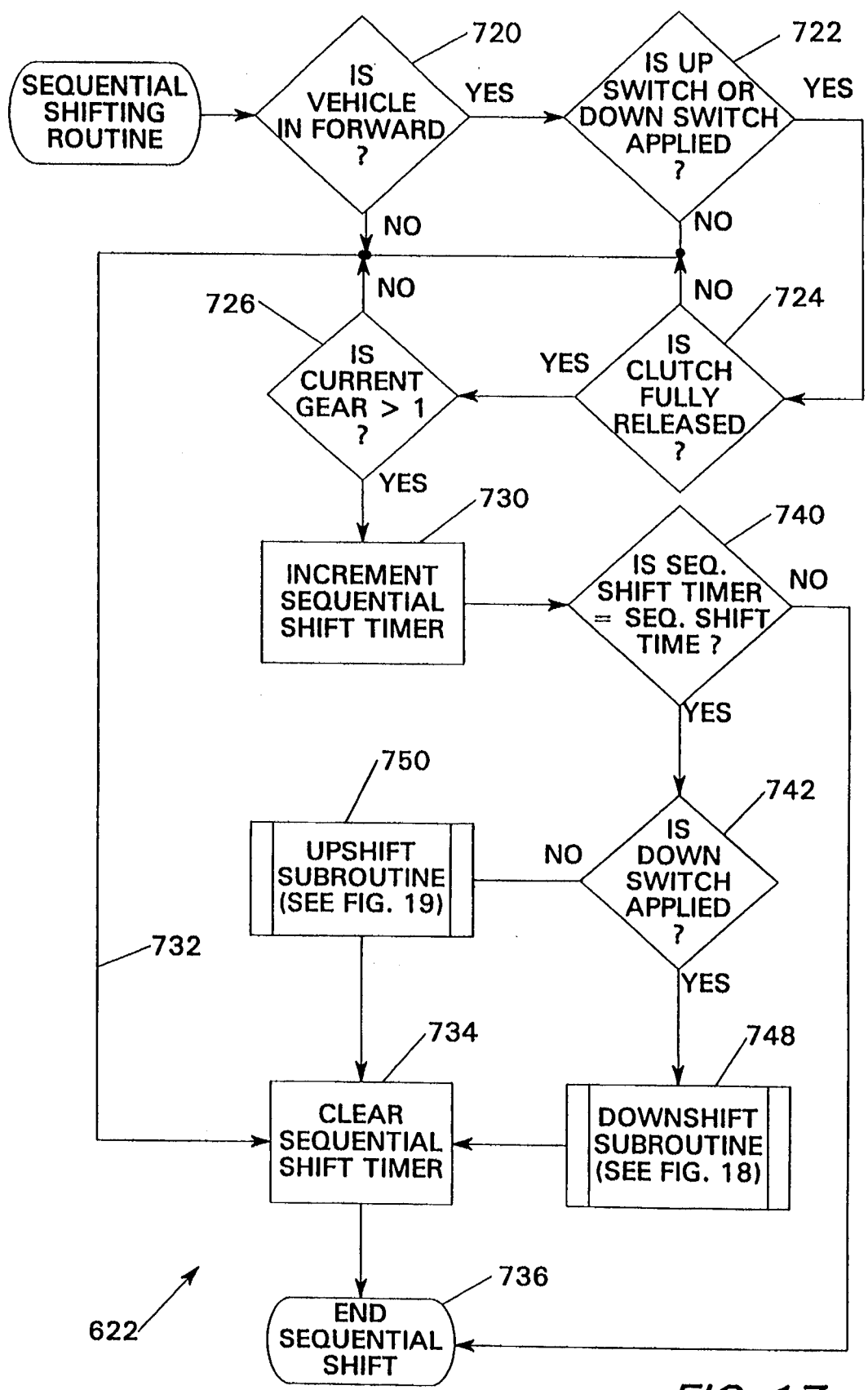

FIG. 17 describes the sequential shifting routine 622 accessed from the 16 MS timer routine referred to in FIG. 14 as block 622. Routine 622 first checks whether the vehicle direction lever 232 is in forward at decision diamond 720. If yes, the diamond 722 checks whether the up switch 244 or down switch 250 is applied. If yes, diamond 724 then checks whether the clutch is released. If yes, diamond 726 then checks whether the current gear is greater than one. If the answer to all four questions posed by decision diamond 720 through 726 is yes, the sequential shift timer is incremented as indicated by block 730. If the answer to any one of the questions of diamonds 720–726 is no, the control passes along the path 732 to block 734, where the sequential shift timer is cleared. Thereafter, control passes to end point 736 of the sequential shift routine which returns the control to the bottom righthand portion of FIG. 14.

At diamond 740, the current value of the sequence shift timer is compared against the overall sequence shift time established for the particular shift being performed. If this overall sequence time has elapsed, control passes to diamond 742 which checks the state of the down switch 250 and thus the state of shift lever 242. If the down switch is applied, the downshift subroutine 748 is invoked. If it is not applied, the upshift subroutine 750 is invoked. These subroutines are respectively shown in FIGS. 18 and 19. After the appropriate subroutine is performed, the sequential shift timer is cleared at block 734 and the sequential shift routine end point 736 is reached.

Figure 18:
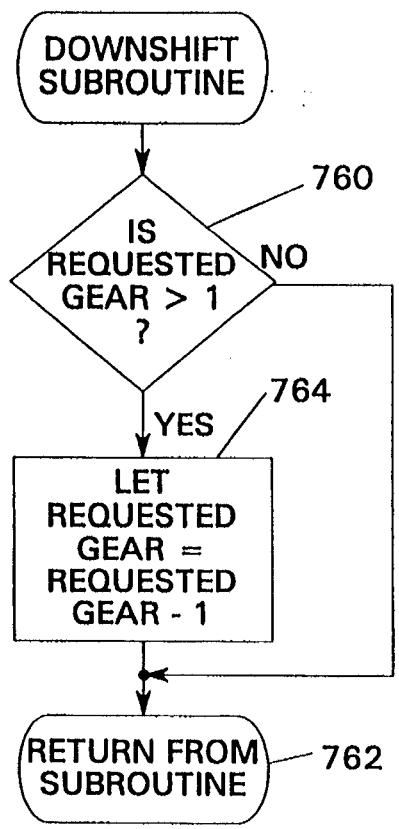

FIG. 18 illustrates the downshift subroutine called by block 692 of FIG. 15 and by block 748 of FIG. 17. The downshift subroutine first checks to determine whether the requested gear is greater than one at diamond 760. If no, requested gear is already at first gear and no action is required. Thus, control passes to the exit point 762. If the requested gear is greater than one, block 762 decrements the requested gear by one. Thereafter, control passes through subroutine exit 762.

Figure 16:
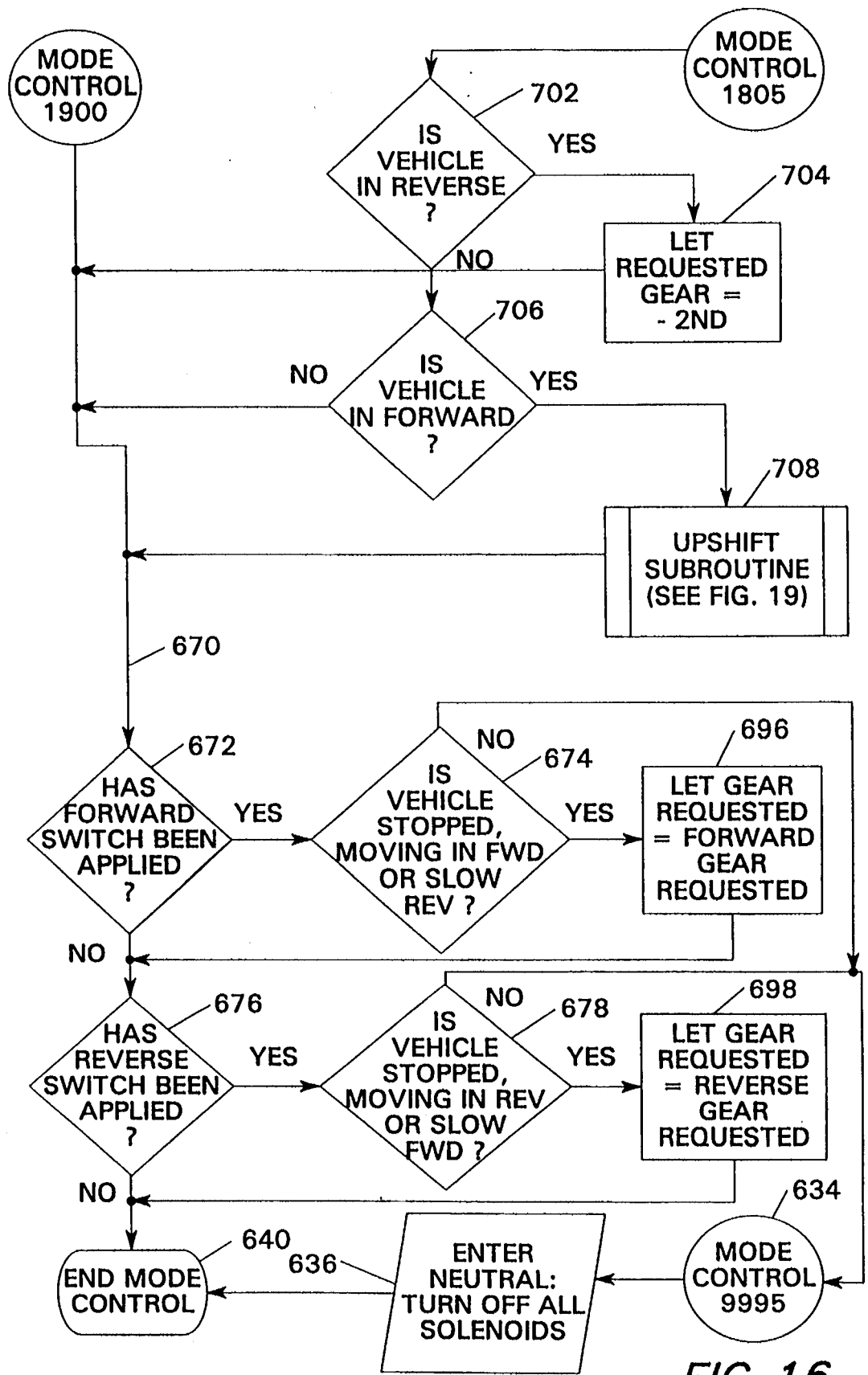
Figure 19:
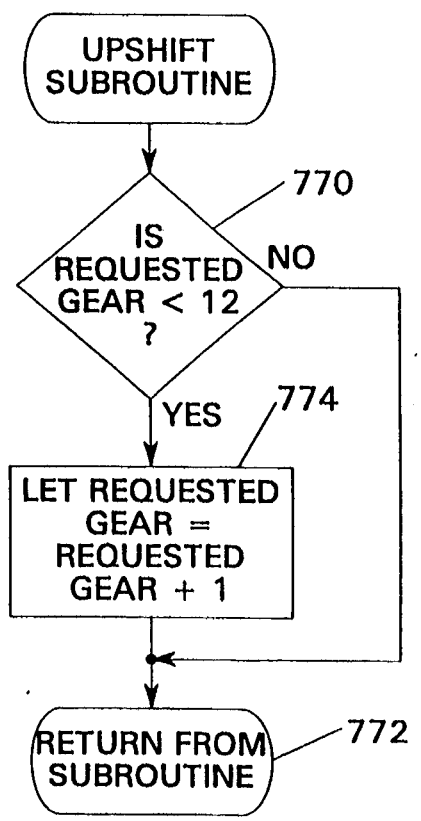

FIG. 19 shows the upshift subroutine called by block 708 in FIG. 16 and by block 750 in FIG. 17. Decision diamond 770 inquiries whether the requested gear is less than 12. If no, this indicates the requested gear is equal to 12 which is the maximum gear value, and control passes to exit point 772. If the requested gear is less than 12, block 774 increments the requested gear by one, then passes control to a subroutine exit point 772.

Figure 20:
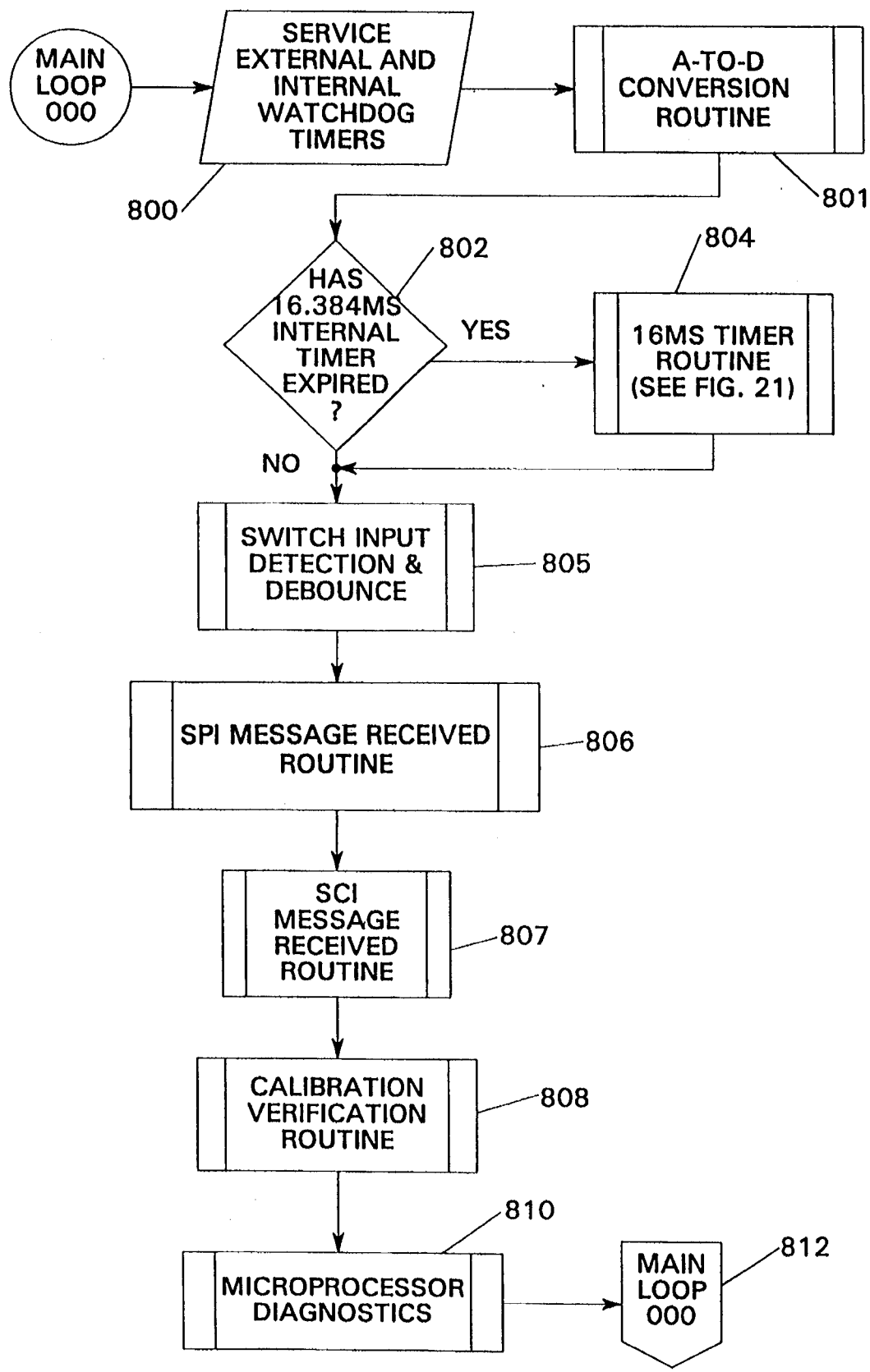
FIGS. 20 and 21 are flowcharts illustrating the software used to operate the second or engine controller of the FIG. 2 control system of the present invention in its normal transmission mode, where
Figure 21:
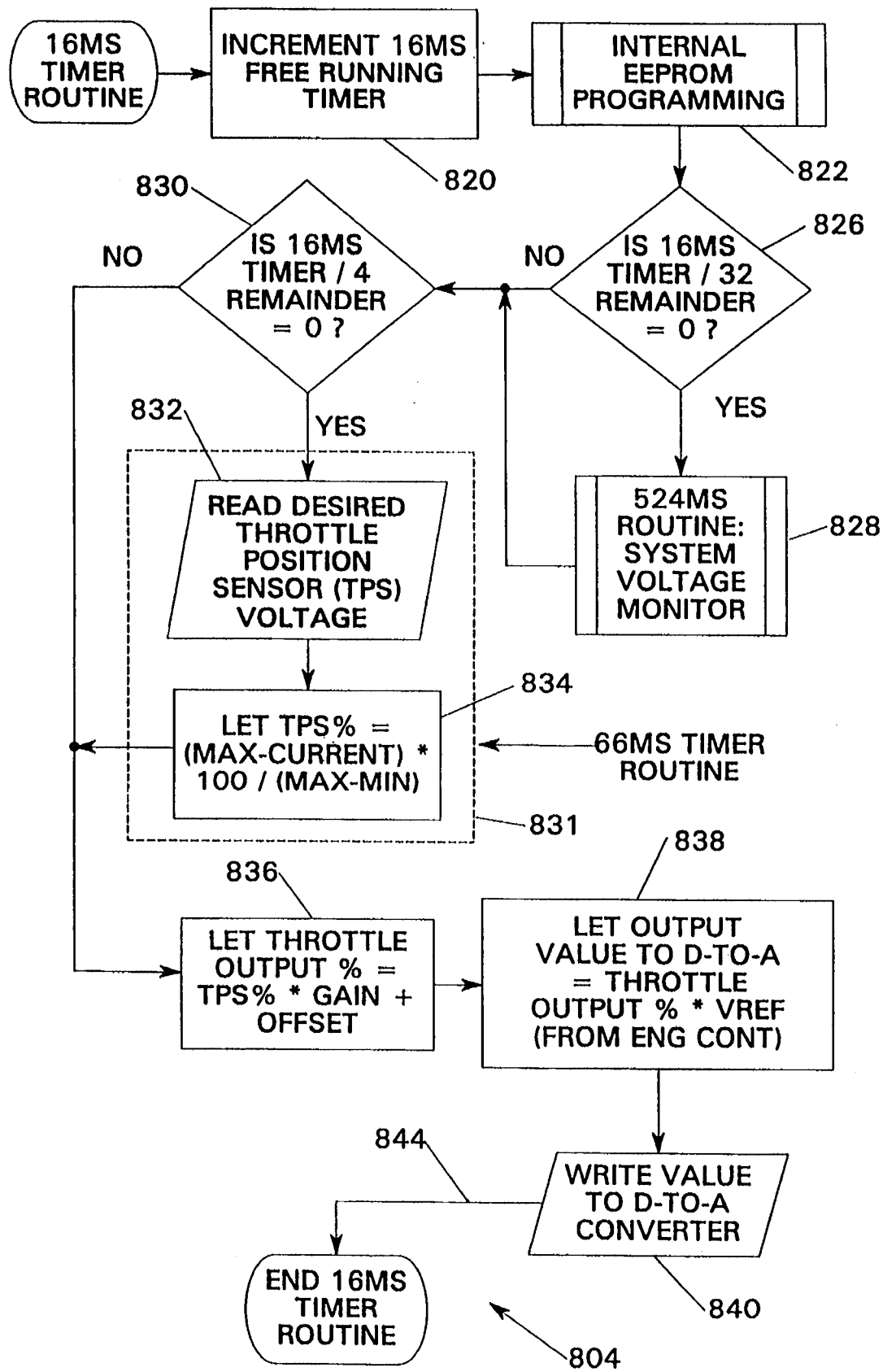

FIGS. 20–21 functionally describe the operation of the software used in controller 302 in connection with the normal pulser mode of operation of control system 90. The software of controller 302 utilizes much of the software of controller 302, and to the extent such common usage of software code exists, the description thereof will not be repeated. Instead, only the differences will be explained here.

Like controller 301, controller 302 include a main loop similar in overall arrangement to the main loop shown in FIG. 11. The controller 302 has no need for a four millisecond timer 466, but instead only uses the 16 millisecond internal timer. Action block 800 services watchdog timers. A/D conversion routine 801 services A/D input circuits to the extent they are used (see FIG. 4 which shows the monitoring of the analog VREF signal and the analog throttle position signal from potentiometer 280). Next, decision diamond 802 checks whether the 16.384 millisecond internal timer of controller 302 has expired. If yes, the 16 millisecond timer routine 804 shown in FIG. 21 is executed. Thereafter, control passes to switch input detection and debounce block 805, then to blocks 806 through 810 in sequence, and finally to main loop return arrow 812 which passes control back to the start point labeled "main loop 000" in FIG. 20.

Block 806 checks for whether messages have been received through SPI port 388 from controller 301. Block 807 checks for external serial communications through port 389. Block 808 performs a calibration verification routine for the same purposes articulated with respect to block 486 of FIG. 11, while block 810 performs microprocessor diagnostics for the reasons articulated with regard to block 488 of FIG. 11.

FIG. 21 shows the 16 millisecond timer routine 804 mentioned in FIG. 20. Here block 820 increments the 16 millisecond free running timer, and block 822 performs any needed EEPROM programming of controller 302, which is performed for the same basic reasons as stated for block 602 in FIG. 14.

Next, decision diamond 826 checks to see whether another 524 millisecond (about one-half second) time interval is beginning. If yes, block 828 is performed to monitor the system voltage for reasons similar to those described with respect to block 610 of FIG. 14. (Note that like the 16 MS timer routine shown in FIG. 14, the FIG. 21 routine also calculates longer intervals by dividing the value of a 16 MS free running timer by a number, such as 32 or 4, and finds the beginning of such longer intervals by checking to see if the remainder equals zero.)

At the beginning of every 66 millisecond interval, decision diamond 830 directs control along its yes path to dotted block 831, which amounts to a 66 MS timer routine. Block 832 of routine 831 reads the desired throttle position sensor (TPS), namely pot 280, as a voltage presented to analog input circuit 368 of controller 302. Block 834 simply scales the digitized analog value received as percent of the overall range of allowed travel of pot 280, as determined by comparing the acquired value against pre-determined maximum and minimum values representing the throttle lever fully forward and fully returned. At block 836 the calculated result or throttle output percentage (TPS %) from block 834 is converted to a digital engine speed command signal by adjusting it using gain and offset values. Then at block 838, the software and hardware combine to present an output value to the D/A converter 400 shown in FIG. 4 as a function of the voltage value VREF read by analog input circuit 368 in FIG. 4. The digital value (Throttle Output %) just calculated is then written through digital output port 386 to the D/A converter 400. This completes the 16 millisecond timer routine 804 of FIG. 20.

Figure 22:
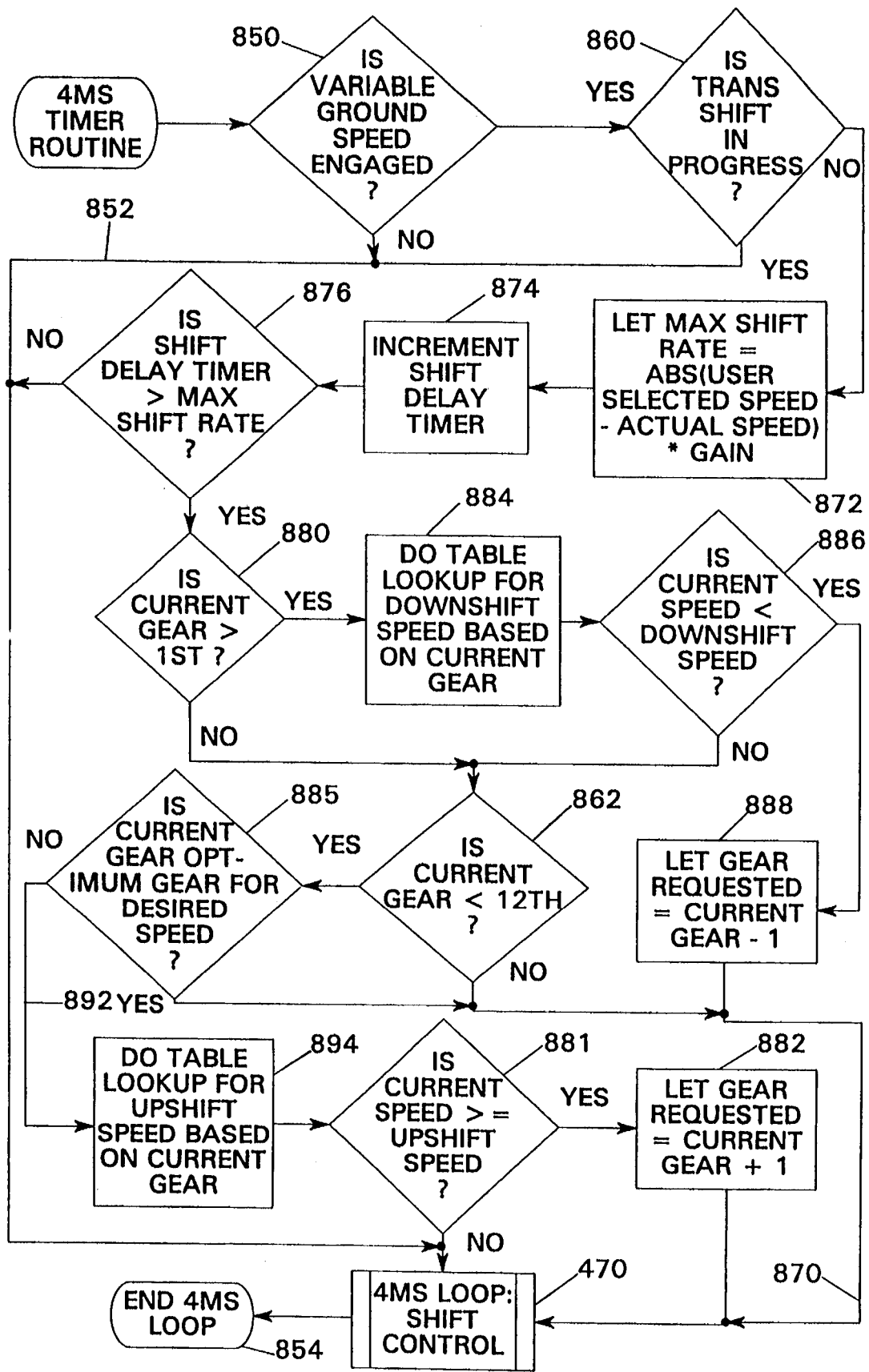
FIGS. 22 and 23 are flowcharts illustrating modifications to the software used to operate the transmission controller of the FIG. 2 control system of the present invention in its variable ground speed control mode, where
Figure 23:
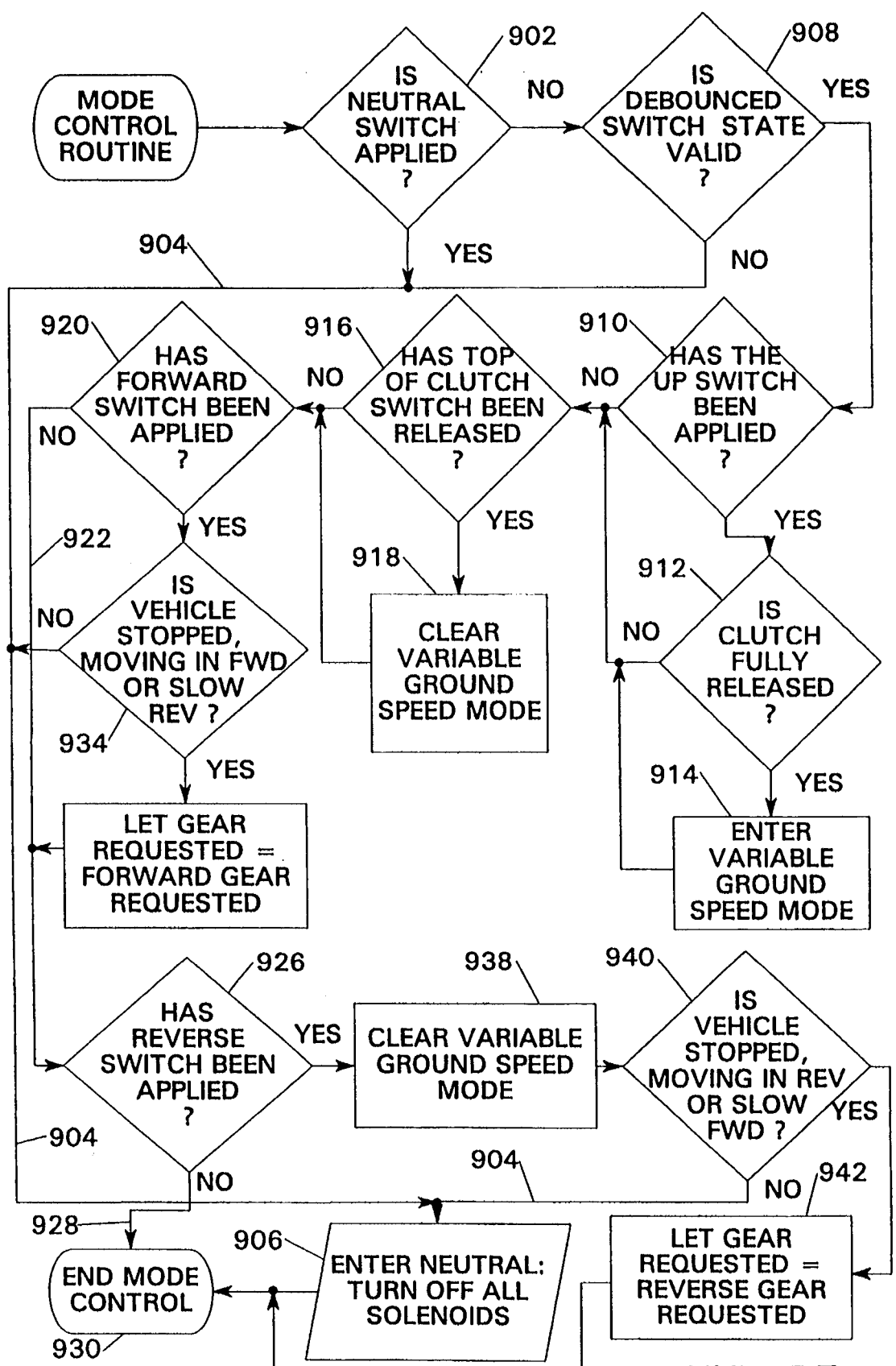

FIGS. 22 and 23 show the modifications required to the software used in the controller 301 in order to implement any one of the variable ground speed modes of the present invention. FIG. 22 illustrates a modified 4 millisecond shift control routine, while FIG. 23 illustrates a modified mode control routine. The software routine shown in FIG. 22 supplements the software control routine described and illustrated with respect to FIGS. 12 & 13, and the software shown in FIG. 23 takes the place of the software routine of the same name shown and described and illustrated with respect to FIGS. 15 and 16, in a manner which will become clear shortly.

FIG. 22 takes the place of block 470 in FIG. 11. Decision diamond 850 asks whether the run mode switch 226 (see FIG. 2) is in its ground speed position. If no, then selector switch 226 should be in its pulser position, meaning that the control system 90 is not in a ground speed mode. Thus, the answer to the question posed by decision diamond 850 is no, control passes along path. 852 to the bottom of FIG. 22 and enters the 4 millisecond loop shift control routine 470 previously described with respect to FIGS. 12 and 13, which is performed. When complete, the routine ends at exit point 854.

If the answer to the question posed by decision diamond 850 is yes, control passes to diamond 860 which asks whether a transmission shift is in progress. If the value of the shift timer (see block 598 in FIG. 13) is not zero, then a shift is in progress, causing control to pass along path 852 and down to the bottom of FIG. 22. There, the block 470, the shift control routine, is executed. In other words, if the transmission is in the process of shifting, as determined at block 860, the transmission controller 301 proceeds to complete the shift normally before taking any additional action.

If the answer to decision diamond 860 is no, control passes to block 872. Here, a variable parameter called the "maximum shift rate" is set to a value proportional to the difference between the desired ground speed and the actual ground speed. The maximum shift rate value is used to determine when the transmission will be allowed to shift from one gear to the next. The larger the difference between desired and actual ground speeds, the faster the transmission 64 will be allowed to shift. This quicker shifting is achieved by reducing the delay time between successive shifts. Thus, as the vehicle's actual speed closes in on the desired speed, the transmission is made to wait longer after the completion of one shift before it begins the next shift. This longer delay time between shifts enables the controller 302, which operates in a closed-loop feedback mode, to have a chance to reduce the error between desired and actual vehicle speeds, by changing the value of engine speed command signal sent to the engine. As the engine speed is varied in a given gear, the vehicle speed will vary in the same direction. Thus increased delay between gear shifts as the ground speed error value becomes smaller helps avoid overshoot and hunting. Note that the maximum shift rate is set equal to an absolute value determined by the difference between the desired or user-selected speed and the actual speed times a gain value. A suitable gain value can be experimentally determined for any given engine/transmission combination through testing.

Next in FIG. 22, block 874 increments the shift delay timer, and passes control to decision diamond 876. Diamond 876 inquires whether the shift delay timer has a greater value than the maximum shift rate value. If the answer is no, then control is passed via path 852 to the bottom of so as to hold off from making any further shifts. If the answer to diamond 876 is yes, then an upshift or downshift will be allowed, depending upon what is required to reduce the absolute value of the ground speed error. In other words, decision diamond 876 asks a question as to whether there has been enough time for the gears to settle out from the last shift. Diamond 876 effectively places a minimum value on the time between gear shifts.

Control then passes to decision diamond 880, which inquires whether a current gear is greater than first. If it is not, then no downshift can be required, and control is passed to decision diamond 862. If the current is greater than first, then the possibility exists that a downshift is needed. At block 884, the controller 301 performs a table look-up to determine the downshift speed based on the current gear. If the current ground speed is less than the downshift speed just looked up, then diamond 886 passes control to block 888. There, the requested gear is set equal to the current gear minus one, and control passes along path 870 to block 470 at the bottom of FIG. 22.

If diamond 886 determined that a downshift was not needed, then control passes to decision diamond 862. Diamond 862 asks whether the current gear is less than the highest gear, namely, the twelfth gear. If the answer is no, then transmission 64 is in twelfth gear, and no upshifts are possible. In this condition, the no path 870 is taken to block 470 at the bottom of FIG. 22. If the current gear is less than the highest gear, diamond 862 passes control to diamond 885. Here, the controller 301 determines whether the current gear is the optimum gear for the desired speed. This answer depends upon the setting of the power mode switch. As will be recalled from FIG. 2, this switch has three settings: maximum horsepower, comfort, and fuel economy.

At diamond 885, if switch 224 is in its "comfort" position, the current gear will be considered the optimum gear as long as the vehicle speed is within the region defined by the "sum" of the hollow and notched blocks in FIG. 7, for the current desired gear shown in FIG. 7. Alternatively, if the vehicle speed is within the region between the upshift and downshift points of FIG. 8, the current gear will be considered the optimum gear.

At diamond 885, if switch 224 is in its maximum horsepower mode, then the controller 301 checks to see whether the desired speed is between the upshift and downshift speeds as shown in Table 1 presented above for the current gear. If yes, then the current gear is the optimum gear and no upshift is allowed.

If the current gear is not the optimum gear for the particular GS mode the system is in, control passes along path 892 to block 894. Here, a table look-up is performed to determine the upshift speed, based upon the current gear and GS mode. Next, at block 880, the current desired speed is compared against the upshift speed for the current gear. If the current vehicle speed is higher than the upshift speed, control passes to block 882 which increments the gear requested by one. Thereafter, control passes to the second shift control routine 470, which carries out the shift to a higher gear.

FIG. 23 shows the mode control routine 616 used when the run mode switch 226 is in its ground speed position. The mode control routine of FIG. 23 is performed as part of the last half of the 16 millisecond timer routine shown in FIG. 14. The first step in the FIG. 23 routine is to inquire whether the neutral switch of direction lever 232 is applied. If yes, control passes along path 904 to action block 906 where all solenoids are turned off. If the neutral switch is not applied, control passes to decision diamond 908 which checks to see whether the current configuration of switch states is a valid combination. If the answer is no, an appropriate error message is displayed on the dashboard unit 92 and control passes along path 904, which places the transmission in neutral.

If the answer to the question asked by decision diamond 908 is yes, control passes to diamond 910 which checks whether the up switch 244 has been applied. If yes, decision diamond 912 checks whether the clutch is fully released, that is whether switch 274 in FIG. 2 is actuated. If yes, the variable ground speed mode is entered at block 914. Next, decision diamond 916 asks whether the top of clutch switch 274 has been released, if yes, then the variable ground speed mode flag is cleared at block 918. At decision diamond 920, the forward switch 236 of the direction lever assembly 228 is checked to see if it has been applied. If no, control passes along path 922 to decision diamond 926 which checks whether the reverse switch 240 of the direction lever assembly 228 has been applied. If no, then path 928 is taken to exit 930.

In FIG. 23 at diamond 920, if the forward switch has been applied, then decision diamond 934 determines whether the vehicle is stopped, moving in a forward direction or moving in slow reverse. If no, the vehicle is moving too quickly in reverse and engaging forward gears is not allowed, and an appropriate error message is displayed and control passes along path 904 to block 906 where the transmission is placed in neutral. If the answer to diamond 934 is yes, the gear requested is set equal to the forward gear requested. Thereafter, control passes to decision diamond 926 which asks whether the reverse switch has been applied. If no, the routine ends at point 930. If yes, the transmission cannot be in a variable ground speed mode since this is not allowed in a reverse gear. Next, decision diamond 940 asks whether the vehicle is stopped moving in reverse or moving in slow forward. If the answer is no, the vehicle is moving in forward at high speed. In either event control passes along path 904 to block 906 which forces the transmission 64 into neutral by turning off all solenoids. If the answer to diamond 940 is yes, the gear requested is set equal to the reverse gear requested at block 942 and then control passes to exit point 930, which leads back to FIG. 14.

Figure 24:
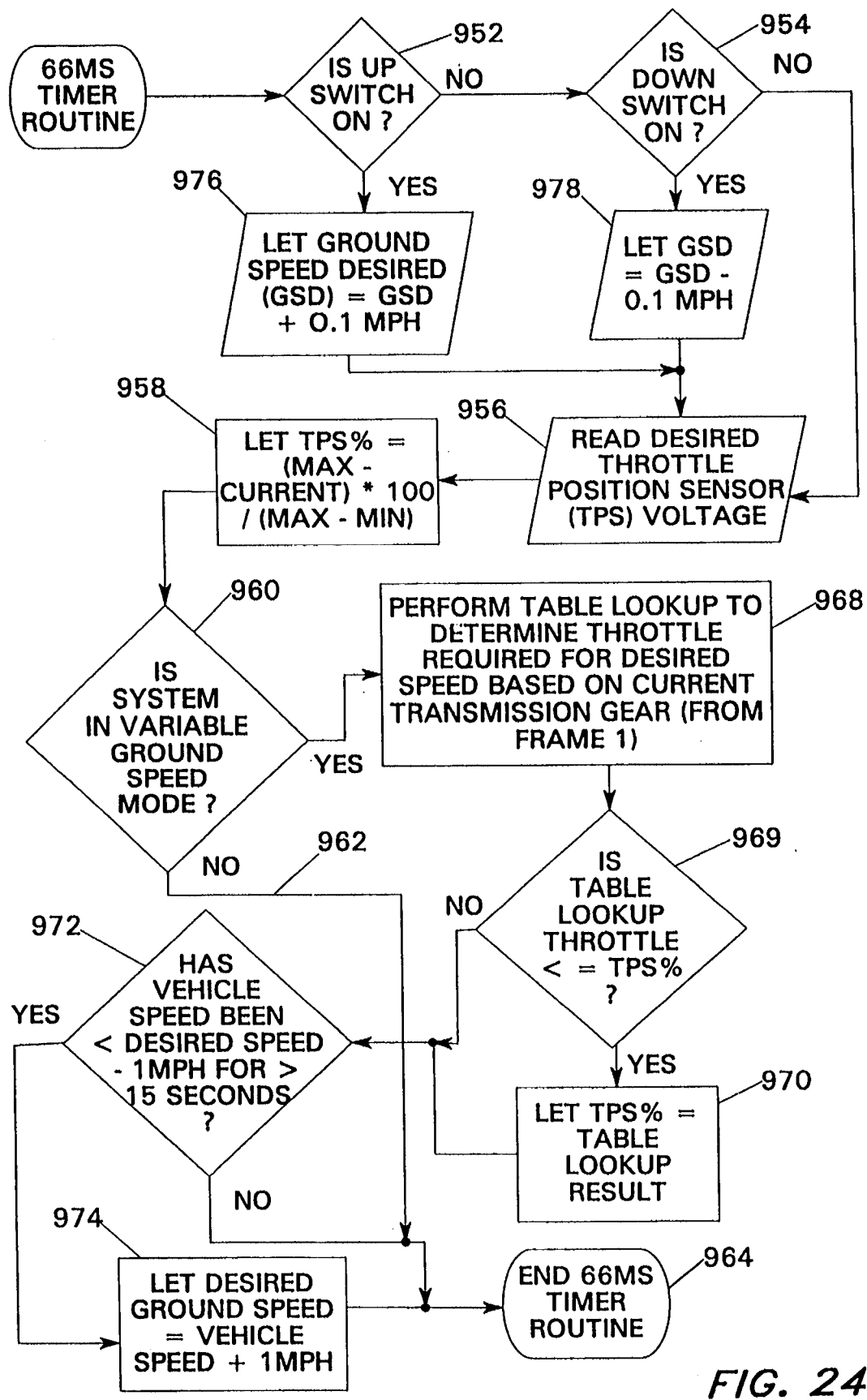
FIG. 24 is a flowchart illustrating modifications to the software used to operate the engine controller of the FIG. 2 control system of the present invention in its variable ground speed control mode, namely a modified 66 millisecond timer routine.

FIG. 24 is a 66 millisecond timer routine which is used when the run mode switch 226 is in its ground speed position, and it takes the place of dotted block 831 in FIG. 21, that is used when switch 226 is in its pulser position. The FIG. 24 routine begins by checking the up switch 244 for shift lever 242 at decision diamond 952. If not applied, the down switch 250 for shift lever 242 is checked at decision diamond 954. If it also is not applied, then control passes along the "no" path to block 956 where the desired throttle position sensor, namely the potentiometer 280 shown in FIG. 2, is read via analog input block 368 shown in FIG. 4. Next, block 958 transforms the acquired voltage value into the percentage value TPS %. Then control passes to decision diamond 960, which checks to make sure the system 60 is in a variable ground speed mode, which was entered at block 914 in FIG. 23. If it is off, "no" path 262 is taken to the exit point 964 of this FIG. 24 routine. If the system is in ground speed mode, the yes path is taken from diamond 960 to block 968. There, the controller 302 performs a table look-up to determine the throttle setting (i.e., engine speed command) required for the desired speed based on the current transmission gear. Note that controller 301 sends the current gear information to controller 302 via the SPI port. The table utilized for this operation contains data corresponding to the information shown in FIGS. 9 and 10. Since the graphs of FIGS. 9 and 10 are straight lines, it is not necessary to store every data point. Rather, the software is preferably set up to interpolate the percent throttle requested value (TPS %). At decision diamond 969, the controller 302 checks whether the result from the table look-up at block 918 is less than the throttle setting selected by the vehicle operator. If no, then the TPS % value is left unchanged, since the throttle setting governs the maximum engine speed command allowed. If the answer to diamond 969 is yes, then control passes to block 970, where the TPS % value is set equal to the table look-up result from block 968.

At decision diamond 972, controller 302 checks to find out whether the actual vehicle speed has been less than the desired vehicle speed minus 1 mph (miles per hour) for more than 15 seconds. If the answer is no, then controller 302 concludes the vehicle is operating at approximately the right speed. If the answer to diamond 972 is yes, then the control system 90 concludes it has not been able to close the loop successfully, that is, it has not been able to make the actual vehicle speed equal the desired ground speed. To overcome this difficulty, the desired ground speed is set equal to the actual vehicle Speed plus 1 mile per hour, which prevents excessive vehicle acceleration if the load on the vehicle is removed.

In FIG. 24, the control sequence is different if either the up switch 224 or down switch 250 for the shift lever 242 is actuated. When the operator pushes the shift lever into its up position, this indicates that the desired speed is to be increased. Thus, the yes path from decision diamond 952 leads to block 976 where the desired ground speed value is set equal to the current desired ground speed value plus 0.1 MPH. Similarly, if the down switch 250 of lever 242 is on, the operator is signifying he wishes to go slower. Accordingly, the yes path from decision diamond 954 in FIG. 24 leads to block 978 which sets the internal ground speed desired value equal to the current desired ground speed value less 0.1 MPH. Thereafter, control passes from block 976 or 978 to block 956 where the desired throttle position sensor is read, and 66 MS timer routine continues as previously described.

In order to provide the vehicle operator with the ability to increase the vehicle speed in 0.1 mph increments, decision diamond 952 preferably includes a delay function which operates as follows. When the operator first actuates the up switch, the block 976 will only be executed once in the first 0.75 seconds it is actuated. If the up switch is maintained thereafter in its actuated state for more than 0.75 seconds, then block 976 will be performed every time the FIG. 24 routine is performed. In this way, the operator, by continuing to hold the shift lever in its up position, is able to have the desired ground speed be more quickly incremented. The decision diamond 954 preferably includes this same type of delay function.

Figure 25:
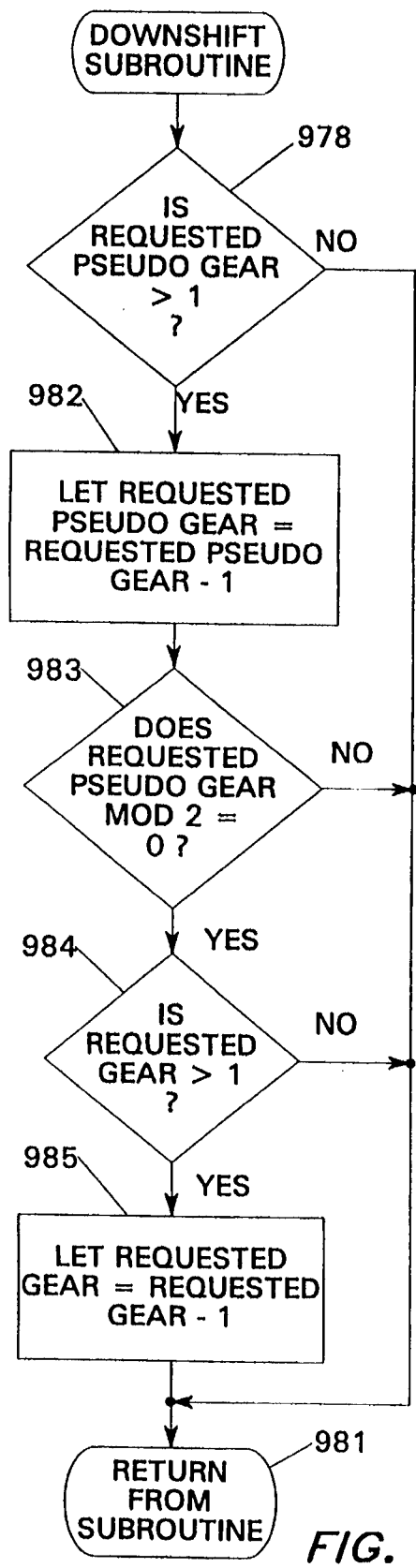
FIGS. 25 and 26 are flowcharts illustrating modifications to the software used to operate the transmission controller of the FIG. 2 control system of the present invention in its pseudo-gear control mode, where
Figure 26:
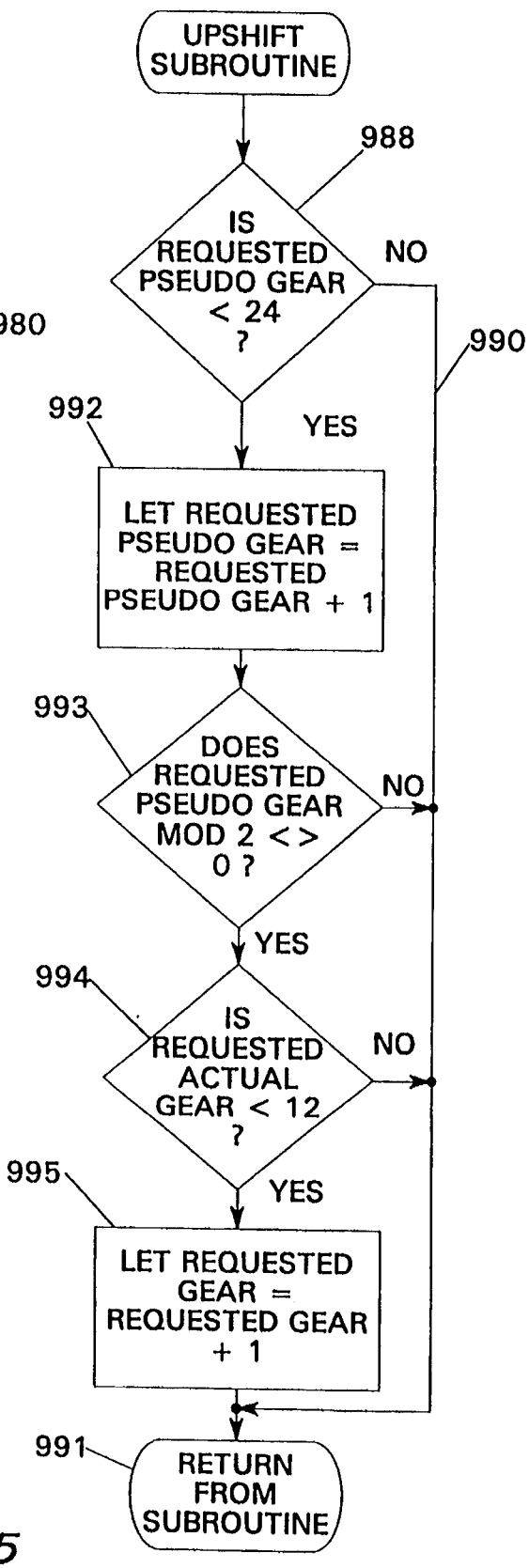
Figure 27:
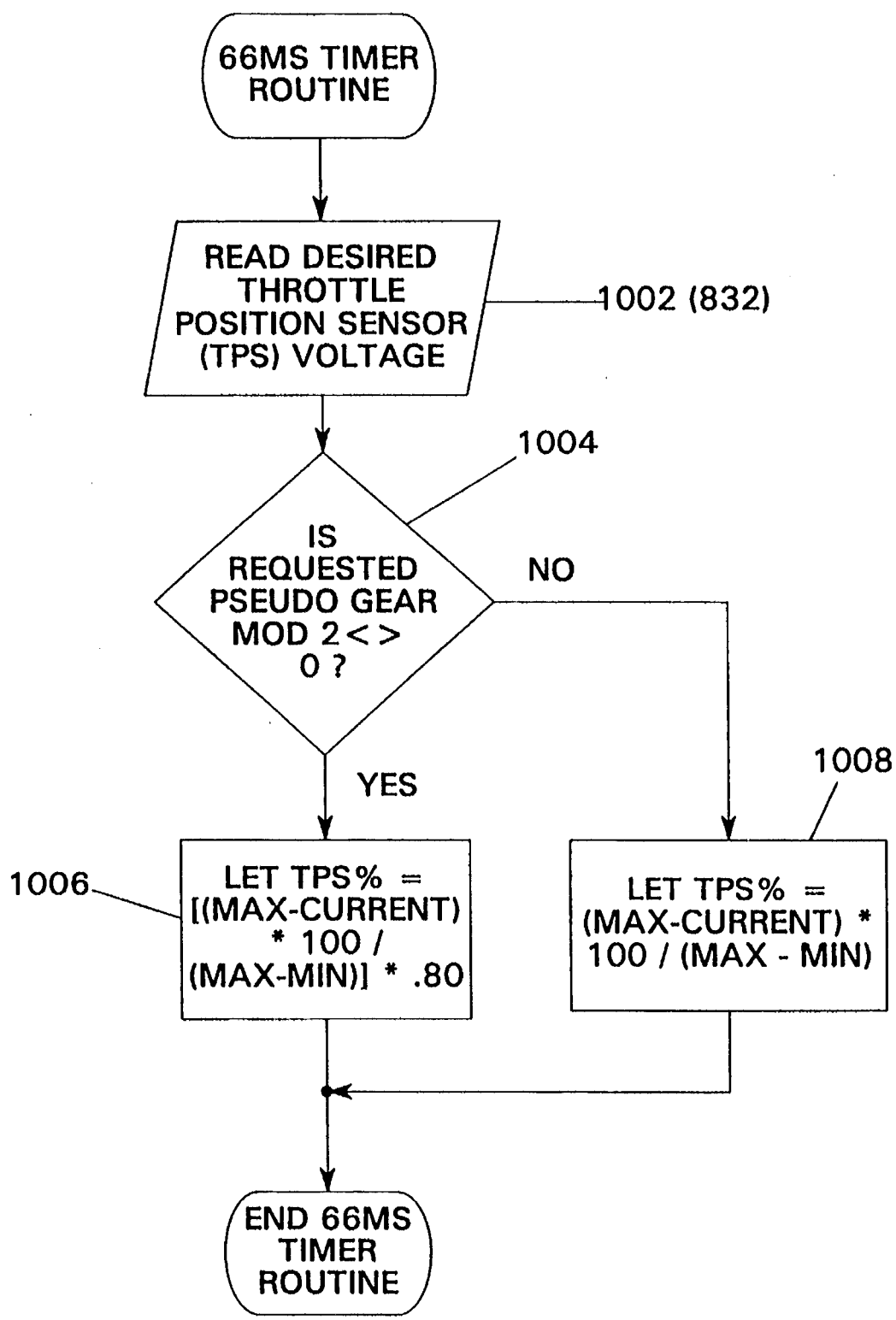
FIG. 27 is a flowchart illustrating modifications to the software used to operate the engine controller of the FIG. 2 control system of the present invention in its pseudo-gear mode.

FIGS. 25–27 illustrate the significant software changes to control system 90 required to implement the pseudo gear mode. As will be recalled, this is a mode of operation where the operator is made to believe by the control system 90 that the transmission 64 has more forward gears than actually exist. The number of apparent gears can if desired equal twice the number of actual forward gears if, for each actual forward gear, the vehicle is allowed to operate at two distinct speeds or distinct bands of speed. The higher speed for each gear is preferably at or about 100% of the throttle lever setting while the lower set point is at about 80% to about 85% of the throttle lever setting. This will be made more clear by the following description.

The downshift and upshift subroutines of FIGS. 25 and 26 take the place of subroutines by the same names shown in FIGS. 18 and 19 when the off-road vehicle is set up to operate in the pseudo-gear mode. FIG. 25 downshift subroutine first inquires at decision diamond 978 whether the requested pseudo-gear is greater than 1. If no, path 980 is taken to the subroutine exit point 981 since downshifting below gear 1 is not possible. If the requested pseudo-gear is greater than 1, control passes to block 982, which decreases the requested pseudo-gear value by 1. Then, decision diamond 983 asks whether the requested pseudo-gear value is an even number. If yes, decision diamond 984 asks whether the requested gear is greater than 1. If yes, the actual requested gear is decreased by 1 at block 985. If the answers at diamond 983 or at diamond 984 is no, the subroutine simply returns through exit point 981.

The FIG. 26 upshift subroutine is similar to the downshift subroutine just described. First, decision diamond 988 checks to determine whether the requested pseudo-gear is less than 24, if not, path 990 is taken to the exit point 991, since in the prototype transmission system, there are only twelve actual gears and in this example only twenty-four pseudo-gears. So the pseudo-gear number cannot be higher than 24.

If the answer to the question asked by diamond 988 is yes, then upshifts are possible, and control passes to block 992. There the requested pseudo-gear value is incremented by 1. Next, at decision diamond 993, the software checks to determine whether the requested pseudo-gear value is odd. If no, the subroutine is exited. If yes, diamond 994 checks to determine whether the requested actual gear is less than 12. If yes, then an actual gear shift is required to have an upshift, and block 994 increments the requested gear by 1. Thereafter the subroutine is exited.

Both the downshift and upshift subroutines just described decrement or increment the pseudo-gear value and the requested gear value. The requested gear value is used as previously described with respect to FIGS. 11–19. The pseudo-gear value is transferred by controller 301 where the software code for the downshift and upshift subroutines in the pseudo-gear modes are stored, to controller 302 via the SPI communications path described in FIG. 4. The use of the requested pseudo-gear value thus transferred is described in the next Figure.

FIG. 27 describes the 66 millisecond timer routine required to operate the offroad vehicle in the pseudo-gear mode. As such, it is used in lieu of the 66 millisecond timer routine designated as dotted block 831 in FIG. 21. In the FIG. 27 routine, the desired throttle position sensor is read at block 1002, which corresponds to the same operation performed by block 832 in FIG. 21. Next, decision diamond 1004 asks whether the requested pseudo-gear is even or odd. If odd, the yes path is taken to block 1006. If even, the no path is taken to block 1008. Block 1006 sets the current throttle percent value to 0.81 of the current value as read from throttle lever pot 280, which results in a lower engine speed. At block 1008, the throttle position percent value is set to 100% of the current value read from the throttle lever pot 280, resulting in a higher engine speed for the current actual gear. Thus, those in the art should appreciate that the selection of an odd pseudo-gear results in a slightly lower engine speed than an even pseudo-gear, all within the same actual gear. Thus, for each actual gear, the vehicle engine will operate at one of two speeds or set points resulting in two different ground speeds. In this manner, a vehicle such as our prototype system with 12 actual gears will appear to the operator to have 24 gears. Note that since the throttle position is adjustable by the operator, this gives the operator the capability of adjusting the maximum engine speed up or down. Since the current throttle command is set as a predetermined fraction of the throttle speed pot setting, the operator is able to vary simultaneously the ground speed in each individual pseudo-gear in proportion to one another through the engine speed throttle lever. This feature further enables the transmission control system 90 to run the transmission 64 at virtually any ground speed desired by the operator by adjusting the maximum engine speed allowed, hence the name "engine variable" transmission control system.

Those skilled in the art will appreciate that the techniques just described with respect to FIGS. 25–27 can also be utilized with three set points per actual gear rather than two set points per actual gear. For example, in the prototype system of the present invention, the twelve gear transmission can be made to appear to be a 36 gear transmission, by providing three set points for each actual gear. In such a system, the highest set point is preferably set to 100% of the throttle pot setting, the intermediate set point would be at about 87.5% of the throttle pot setting, and the third and lowest set point would be at about 75% of the throttle pot setting. Those in the art will appreciate that, if desired, these percentages can be adjusted to 100%, 90% and 80% of the throttle pot setting or other percentages. When the control system 90 is set up to operate in the pseudo-gear mode, the movement of shift lever 242 increments or decrements the pseudo-gear value, since calls in FIGS. 15, 16 and 17 to the upshift or downshift subroutine result in the software code accessing the subroutines of FIGS. 25 or 26 rather than FIGS. 18 or 19. Except for these calls to different upshift and downshift subroutines, the mode control and sequential shifting software of FIGS. 15–16 and FIG. 17 remains unchanged.

The communications routines used to transfer messages between frames 1 and 2, that is controllers 301 and 302, will now be described. As noted earlier, the controller 301 preferably has its software code set up to act as the master controller. Its SPI transmit message routine is found as block 626 at the bottom of the FIG. 14 routine, which is the 16 MS timer routine. Thus, such messages are transmitted by the master controller 301 approximately every 16 milliseconds. The routine of block 626 works as follows. First the current engine speed, the current vehicle speed and the current gear and switch state information are stored in RAM buffer registers. Next the synchronous peripheral interface SPI is ordered to send these four values one byte at a time over to controller 302. This SPI is interrupt driven, so that every time a byte has been transferred and its transmit buffer is empty, a transmit interrupt is generated. The interrupt code loads the next byte from the buffer and initiates its transfer. This process is repeated until the whole message has been transmitted. As each transferred byte is received, it too causes an interrupt to be generated by the receiving SPI, which is processed by controller 302. The interrupt code of controller 302 simply loads these bytes into a specified locations in RAM. Then, as indicated in block 806 of FIG. 20, the SPI messages are accessed from those locations, error-checked, and then made available to the remainder of the software code in controller 302 which needs to access such parameters.

Within microseconds after receiving a complete message from controller 301, controller 302's main loop (FIG. 20) block 806 will process the received message and send its response to the received information.

This routine loads the current throttle position as measured by potentiometer 280 and desired ground speed, into buffer registers, for transmission through the SPI port to controller 301. If desired, functionality checks, error codes or any other information may also be passed back and forth as part of the transfer in either direction, simply by appending these codes to the message to be transmitted. This is accomplished simply by increasing the number of bytes to be transmitted.

For example, information about the mode in which control system 60 is in can be transmitted by controller 301 to controller 302. Bits or flags can be sent which indicate whether (and which) variable ground speed mode is engaged or disengaged, whether the up switch or down switch are actuated, and the desired gear. Similarly, the command state may be transferred between controllers, such as a request to disengage variable ground speed control. Such a request may come from controller 302 if the software is programmed to protect against undesirable engine conditions, such as hunting, which may be the basis for controller 301 terminating the variable ground speed mode and displaying an appropriate error code message.

Those in the art will appreciate that electronic controllers used to control powershift transmissions or internal combustion engines or both operate in a real-time environment. Thus, it is preferred to take steps in the design of the software, such as the various timing control loops presented above, to ensure that all important parts of the software code associated with operation of the vehicle are executed at regular intervals amounting to no more than a fraction of a second. This ensures prompt attention to any changes in external or internal conditions.

Armed with the foregoing detailed description and the hardware block diagrams and software flowcharts, those skilled in the art of designing hardware and software for electronic control systems used for heavy-duty off-road vehicles will be readily able to design suitable hardware circuits based around microprocessors and write suitable software control programs to make use of the electronic control system and methods described above. Such programs may be written in one or more assembly languages or a higher-level language such as C. Such programs are preferably written in a computer programming language specifically designed for the microprocessor forming the heart of electronic controllers used within the control system. For example, in the prototype system of the present invention, which uses two Motorola HC6811 microprocessors, the Motorola assembly language for these processors are used, because it executes quickly, is compact and highly efficient. For extra compactness, the code is written using many separate routines as described above, so that the need to store duplicative code is largely avoided.

While the foregoing detailed description has been directed to a powershift transmission which has 12 forward gears and 2 reverse gears, those skilled in the art will appreciate that the teachings of the present invention are equally applicable to other powershift transmissions, such as those having 8 forward gears and 2 reverse gears, among others.

The control system and methods of the present invention are preferably used on agricultural vehicles such as tractors and combines, but may be used on various other types of heavy-duty off-road vehicles such as, large dump trucks, road graders and front-end loaders. To maximize the benefits obtained from using the systems and methods of the present invention, it is important to use an internal combustion engine having a relatively broad torque versus engine speed curve. When such an engine is used, the pseudo-gear concept becomes practical since the engine may be run at two or more distinct speeds for each transmission gear, and the comfort mode fuel economy, mode and maximum horsepower mode are also made very practical.

As used herein the term "off-road vehicle" includes any mobile vehicle which is principally used in the agricultural, construction equipment, or mining industries. Such off-road vehicles include but are not limited to tractors, combines, dump trucks, front-end loaders, bulldozers, and road graders. The term "powershift transmission" includes a relatively heavy-duty power transmission unit having at least one rotatable power input shaft and one rotatable power output shaft which may be coupled together in power-transmitting relation by the selective engagement of two or more hydraulically-actuated clutches and gears associated therewith operated by electrically-actuated hydraulic valves.

As used herein, the term "electrically-operated hydraulic valves" includes hydraulic valves or the like which have solenoids, coils, electric windings or any other type of electrically-actuated operators.

As used herein, the term "electric signal" includes DC signals and pulsating signals which may have, but do not have to have, a periodic or repetitive waveform, such as rectangular, triangular or sinusoidal waveforms. It also includes those waveforms which have a net DC component, such as the PWM signals discussed herein.

As used herein, the term "controller means" or "controller" includes any microprocessor, microcomputer or digital electronic system using one or more MSI, LSI or VLSI integrated circuits operable by firmware or software. Both firmware and software are considered to be forms of stored program control.

The foregoing detailed description shows that the preferred embodiment of the present invention is well suited to fulfill the objects stated above. It is recognized that 15 those skilled in the art may make various modifications or additions to the preferred embodiment chosen to illustrate the present invention without departing from the spirit and proper scope of the present invention, which is defined by the appended claims, including all fair equivalents thereof.

We claim:

1. A computer-implemented method of providing an operator interface for a self-powered off-road vehicle having an internal combustion engine and multiple gear powershift transmission controlled by an electronic control system, the method comprising the step of:

(a) commanding, via the electronic control system, the transmission to operate in a particular one of a plurality of actual transmission gears;

(b) commanding, via the electronic control system, the engine to operate at a particular desired engine speed; and (c) indicating to the operator that the transmission has more forward gears than actually exist by advising the operator that the transmission is operating in a forward transmission gear other than the particular one actual transmission gear in which the transmission is actually operating.

2. A method as in claim 1, wherein the transmission has X forward gears, where X is an integer having a value of at least four, and the method further comprises the step of:

simulating, via an operator display information originating from the electronic control system, that the transmission has at least 2X forward gears.

3. A method as in claim 2, further comprising the steps of:

(d) providing an operator selected desired vehicle speed to the electronic control system; and (e) determining which particular actual transmission gear and actual engine speed the transmission should be operated at to achieve the operator-selected desired vehicle speed.

4. A method as in claim 1, further comprising the step of:

(d) for each transmission gear, providing through information programmed into the electronic control system, two simulated transmission gears, including a lower simulated gear and a higher simulated gear.

5. A method as in claim 4, further comprising the step of:

for each lower simulated gear and each higher simulated gear of each actual gear, assigning a range of engine speeds with which each such simulated gear is associated, and wherein for each actual gear, the range of assigned engine speeds for the lower simulated gear associated therewith is generally less in revolutions per minute than the range of assigned engine speeds for the higher simulated gear.

6. A method of claim 1, wherein the transmission has X forward gears, where X is an integer having a value of a least 1, and the method further comprises the step of:

(d) simulating, via operator display information originating from the electronic control system, that the transmission has N more gears than the X actual gears, where N is an integer having a value of at least 1.

7. A method as in claim 6, further comprising the steps of:

(e) providing an operator-selected desired vehicle speed to the electronic control system; and (f) determining which particular actual transmission gear and actual engine speed the transmission should be operated at to achieve the desired vehicle speed.

8. A method as in claim 7, further comprising the step of:

(g) for each actual transmission gear, providing through information programmed into the electronic control system, N simulated transmission gears in addition to the X actual transmission gears, with selected actual gears having simulated transmission gears.

9. A method as in claim 8, further comprising the step of:

for each simulated transmission gear of each actual transmission gear, assigning a range of engine speeds with which each said simulated transmission gear is associated, and wherein the range of assigned engine speeds for a lower simulated transmission gear is generally less in revolutions per minute than the range of assigned engine speeds for a higher simulated transmission gear in the same associated actual transmission gear.

10. An computer controlled electronic control system for providing an operator interface for a self-powered off-road vehicle having an internal combustion engine and multiple gear powershift transmission, the control system comprising:

an electronic controller operating in accordance with at least one stored program for providing transmission and engine control signals required to command the powershift transmission to operate in any particular one of a plurality of actual forward gears, and to command the engine to operate at any one of a plurality of different desired engine speeds;

a first electrical output system for commanding the transmission to operate in a particular one of the actual transmission gears indicated by the transmission control signals from the electronic controller;

a second electrical output system for commanding the engine to operate at a particular engine speed indicated by at least one engine control signal from the electronic controller; and a display, responsive to the electronic controller, for indicating to the operator that the transmission has more forward gears than actually exist by displaying to the operator a forward gear which is other than the actual forward gear in which the transmission is actually operating in.

11. An electronic system as in claim 10, wherein:

the electronic controller includes a first electronic controller for providing the transmission control signals, and a second electronic controller for providing at least one engine control signal, the first and second electronic controllers each including a communications system for passing information back and forth to each other, and each being operable under the control of a distinct stored program.

12. An electronic system as in claim 11, wherein:

the display is operator by a selected one of the first and second electronic controllers, and the selected one of the first and second electronic controllers receives information from the other of the electronic means to be provided to the operator via the display means.

13. An electronic control system as in claim 11, wherein:

the display is operator by the first electronic controller; and the first electronic controller is arranged to receive information from the second electronic controller and is arranged to provide at least some of the received information to the operator via the display.

14. The electronic control system as in claim 11, wherein:

the second electronic controller is arranged to receive an electronic signal from an operator adjustable throttle to provide the operator with the capability to vary the ground speed of the vehicle.

15. The electronic control system as in claim 11, wherein:

the first electronic controller is arranged to receive an electronic signal from a first operator input device providing the operator with the capability to shift to a higher or lower gear, and the first electronic controller receives an electronic signal from a second operator input device providing the operator with the capability to select a forward or reverse direction of the vehicle.

16. An computer controlled electronic control system for providing an operator interface for a self-powered off-road vehicle having an internal combustion engine and a multiple gear powershift transmission, the control system comprising:

- an electronic controller operating in accordance with at least one stored program for providing transmission and engine control signals required to command the transmission to operate in any particular one of a plurality of actual forward gears, and to command the engine to operate at any one of a plurality of desired engine speeds;
- the electronic controller includes a first electronic controller for providing transmission control signals, and a second electronic controller for providing at least one engine control signal, the first and second electronic controllers each being operable to transmit and receive information from the other controller, and each being operable under the control of a distinct stored program;
- a first electrical output for commanding the transmission to operate in a particular actual transmission gear indicated by the transmission control signals from the first electronic controller;
- a second electrical output for commanding the engine to operate at a particular speed indicated by at least one engine control signal from the second electronic controller;
- a display, responsive to the first electronic controller, for indicating to the operator that the transmission is operating in a transmission gear other than the actual transmission gear in which the transmission is actually operating, and said first electronic controller being arranged to receive information from the second electronic controller and is arranged to provide at least some of the received information to the operator via the display;
- the second electronic controller being operable to receive an electronic signal from an operator adjustable throttle to provide the operator with the capability to vary the ground speed of the vehicle; and
- the first electronic controller being operable to receive an electronic signal from a first operator input device providing for operator capability to select a higher or lower gear, and the first electronic controller being operable to receive an electronic signal from a second operator input device providing for operator capability to select a forward or reverse direction.

17. The electronic control system as in claim 16, wherein the display comprises a bar graph display.

18. The electronic control system as in claim 16, wherein the display comprises a segmented light emitting display for displaying a plurality of characters.

19. The electronic control system as in claim 16, wherein the display comprises at least a 20 character dot matrix display which is capable of presenting one or more alphanumeric messages.

20. The electronic control system as in claim 16, the system further comprising:

- a first pivotal hand lever which forms part of the first operator input device providing for operator capability to select a higher or lower gear; and
- a second pivotal hand lever which forms part of the second operator input device providing for operator capability to select a forward or reverse direction.

* * * * *

UNITED STATES PATENT AND TRADEMARK OFFICE
CERTIFICATE OF CORRECTION

PATENT NO. : 5,526,261
DATED : June 11, 1996
INVENTOR(S) : Kallis, Adrian G. et al.

It is certified that error appears in the above-indentified patent and that said Letters Patent is hereby corrected as shown below:

Title page, item [75], Inventors, line 2, replace "Needham; Kevin L. Brekkestran, all of Fargo" with --Needham, Fargo; Kevin L. Brekkestran;--.

Title Page, Abstract, line 4, delete "the" before at least.

Title Page, Abstract, line 4, replace "on" with --one--.

Title Page, Abstract, line 13, after "monitor the" insert --engine to operate at one of a number of different desired engine speeds and to monitor the--.

Column 4, line 47, delete ",".

Column 9, line 59, replace "magneticallyoperated" with --magnetically-operated--.

Column 10, line 63, replace "transmission" with --transmissions--.

Column 12, line 11, delete ")" after 0.

Column 13, line 14, replace "2." with --2,--.

Column 16, line 20, after "as" add --to--.

Column 17, line 35, replace "1 00" with --100--.

Column 18, line 35, replace "and are" with --and 2 are--.

Column 21, line 38, replace "powerup" with --power-up--.

Column 26, line 34, replace "include" with --includes--.

Column 30, line 47, replace "Speed" with --speed--.

Column 33, line 13, delete "a".

UNITED STATES PATENT AND TRADEMARK OFFICE
CERTIFICATE OF CORRECTION

PATENT NO. : 5,526,261
DATED : June 11, 1996 Page 2 of 2
INVENTOR(S) : Kallis, Adrian G. et al.

It is certified that error appears in the above-indentified patent and that said Letters Patent is hereby corrected as shown below:

Column 34, line 56, delete "15".

Column 34, line 67, claim 1, replace "step" with --steps--.

Column 35, line 28, claim 4, replace "each transmission" with --each actual transmission--.

Column 36, line 5, claim 10, replace "An" with --a--.

Column 36, line 41, claim 12, replace "operator" with --operated--.

Column 36, line 48, claim 13, replace "operator" with --operated--.

Column 37, line 1, claim 16, replace "An" with --a--.

Signed and Sealed this

Twenty-fourth Day of December, 1996

*Attest:*

BRUCE LEHMAN

*Attesting Officer* *Commissioner of Patents and Trademarks*